United States Patent
Barton et al.

(10) Patent No.: US 11,564,057 B2
(45) Date of Patent: Jan. 24, 2023

(54) PRIORITIZED SCHEDULING FOR UWB RANGING

(71) Applicant: Cisco Technology, Inc., San Jose, CA (US)

(72) Inventors: Robert Edgar Barton, Richmond (CA); Jerome Henry, Pittsboro, NC (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/146,838

(22) Filed: Jan. 12, 2021

(65) Prior Publication Data

US 2022/0070613 A1     Mar. 3, 2022

Related U.S. Application Data

(60) Provisional application No. 63/069,917, filed on Aug. 25, 2020.

(51) Int. Cl.
    *H04W 4/02*            (2018.01)
    *H04W 72/10*          (2009.01)
    *H04B 1/7163*        (2011.01)

(52) U.S. Cl.
    CPC .......... *H04W 4/023* (2013.01); *H04B 1/7163* (2013.01); *H04W 72/10* (2013.01)

(58) Field of Classification Search
    CPC ..... H04W 4/023; H04W 72/10; H04B 1/7163
(Continued)

(56) References Cited

U.S. PATENT DOCUMENTS

| | | | |
|---|---|---|---|
| 6,941,110 B2 | 9/2005 | Kloper et al. | |
| 8,144,685 B2 * | 3/2012 | Sakoda | H04L 5/0058 |
| | | | 370/348 |

(Continued)

FOREIGN PATENT DOCUMENTS

| | | |
|---|---|---|
| CN | 109348409 A | 2/2019 |
| CN | 105430767 B | 4/2019 |

(Continued)

OTHER PUBLICATIONS

Paul et al. (An Energy-Efficient Positioning-Enabled MAC Protocol (PMAC) for UWB Sensor Networks). (Year: 2020).*

(Continued)

*Primary Examiner* — Hirdepal Singh
(74) *Attorney, Agent, or Firm* — Edell, Shapiro & Finnan, LLC

(57) ABSTRACT

Presented herein are techniques for scheduling Ultra-Wideband (UWB) anchors and mobile devices for client ranging. A control device can determine respective ranging priorities for a plurality of mobile devices, which are each assigned to at least one UWB anchor. The control device can obtain at least one collision mapping identifying, for a respective pair of the mobile devices, a collision probability that a UWB signal associated with a ranging procedure involving a first mobile device of the respective pair will collide with a UWB signal associated with a ranging procedure involving a second mobile device of the respective pair. The control device can establish a ranging schedule for the mobile devices and UWB anchors based on the respective UWB ranging priorities and the collision mapping(s). The control device can send at least one command to cause UWB ranging procedures to be performed according to the ranging schedule.

20 Claims, 15 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 8,515,411 B2 | 8/2013 | Sarkar et al. | |
| 8,559,887 B2 | 10/2013 | Stager et al. | |
| 8,776,221 B2 | 7/2014 | Rangarajan et al. | |
| 9,763,216 B2 | 9/2017 | Sayeed | |
| 9,823,330 B2 | 11/2017 | Hart et al. | |
| 9,949,083 B1 | 4/2018 | Kirby et al. | |
| 9,998,856 B2 | 6/2018 | Edge | |
| 10,064,012 B1 | 8/2018 | Boston et al. | |
| 11,199,406 B2* | 12/2021 | Dormody | G01L 27/002 |
| 11,246,010 B2* | 2/2022 | Mao | G01S 5/14 |
| 11,271,943 B2* | 3/2022 | Urabe | H04W 12/06 |
| 2005/0085190 A1 | 4/2005 | Nishikawa | |
| 2008/0101296 A1 | 5/2008 | Palin et al. | |
| 2008/0186231 A1 | 8/2008 | Aljadeff et al. | |
| 2009/0311960 A1 | 12/2009 | Farahani et al. | |
| 2010/0271263 A1 | 10/2010 | Moshfeghi | |
| 2013/0138314 A1 | 5/2013 | Viittala et al. | |
| 2014/0152437 A1 | 6/2014 | Tian et al. | |
| 2015/0156637 A1 | 6/2015 | Li et al. | |
| 2015/0289099 A1 | 10/2015 | Marano et al. | |
| 2015/0378002 A1 | 12/2015 | Hughes et al. | |
| 2016/0178727 A1 | 6/2016 | Bottazzi | |
| 2016/0212579 A1 | 7/2016 | Duan et al. | |
| 2017/0003374 A1 | 1/2017 | Hehn et al. | |
| 2017/0082727 A1 | 3/2017 | Sendonaris et al. | |
| 2017/0123039 A1 | 5/2017 | Shin et al. | |
| 2017/0123045 A1 | 5/2017 | Shin et al. | |
| 2017/0280281 A1 | 9/2017 | Pandey et al. | |
| 2017/0356979 A1 | 12/2017 | Georgiou et al. | |
| 2018/0310272 A1 | 10/2018 | Younis | |
| 2019/0033423 A1 | 1/2019 | Moslifeghi | |
| 2019/0110227 A1 | 4/2019 | Lepp et al. | |
| 2019/0135229 A1 | 5/2019 | Ledvina et al. | |
| 2019/0166574 A1 | 5/2019 | Abou-Rizk et al. | |
| 2019/0195981 A1 | 6/2019 | Ding et al. | |
| 2019/0252064 A1 | 8/2019 | Pipher et al. | |
| 2019/0349709 A1 | 11/2019 | Kim et al. | |
| 2019/0387374 A1 | 12/2019 | Gherardi et al. | |
| 2020/0014526 A1 | 1/2020 | Hammerschmidt et al. | |
| 2020/0037113 A1 | 1/2020 | Tyagi et al. | |
| 2020/0041601 A1 | 2/2020 | Ko et al. | |
| 2020/0137676 A1 | 4/2020 | Yoon et al. | |
| 2020/0178036 A1 | 6/2020 | Edge | |
| 2020/0209341 A1 | 7/2020 | Ylamurto et al. | |
| 2020/0228943 A1 | 7/2020 | Martin et al. | |
| 2020/0314681 A1* | 10/2020 | Kuo | H04W 28/0268 |
| 2021/0136556 A1 | 5/2021 | Lee et al. | |
| 2021/0352434 A1* | 11/2021 | Harvey | H04W 8/005 |
| 2021/0400441 A1* | 12/2021 | Burowski | G01S 5/14 |

FOREIGN PATENT DOCUMENTS

| | | |
|---|---|---|
| CN | 110730422 A | 1/2020 |
| CN | 210042235 U | 2/2020 |
| WO | 2015078327 A1 | 6/2015 |
| WO | 2017091792 A1 | 6/2017 |
| WO | 2019067105 A1 | 4/2019 |
| WO | WO-2022025693 A1 * | 2/2022 |

OTHER PUBLICATIONS

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™-2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15.4a™-2007, Aug. 31, 2007, 203 pages.

Harnesswalla, Taha, "IEEE 802.15.4a—Understanding the protocol and Reducing Multi-User Interference", https://scholar.colorado.edu/concern/graduate_thesis_or_dissertations/pv63g062v, Apr. 9, 2013, 80 pages.

Sang, Cung Lian et al., "Numerical and Experimental Evaluation of Error Estimation for Two-Way Ranging Methods", https://www.ncbi.nlm.nih.gov/pmc/articles/PMC6387385/, Feb. 1, 2019, 28 pages.

Stocker, Michael, "Design of a Decentralized and Synchronous UWB-based Localization System", May 2018, 111 pages.

El-Kamchouchi, Hassan Mohamed et al., "Towards a Precise Direction of Arrival Estimation for Coherent Sources Using ECMUSIC", Journal of Electrical and Electronic Engineering vol. 4, Issue 2, http://article.sciencepublishinggroup.com/html/10.11648.j.jeee.20160402.17.html, Apr. 2016, 9 pages.

Xiaojie Zhao et al., "Does BTLE measure up against WiFi? A comparison of indoor location performance", VDE Verlag GMBH, Berlin, Offenbach, Germany, ISBN 978-3-8007-3621-8, European Wireless, Jan. 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

"802.15.4-2020—IEEE Standard for Low-Rate Wireless Networks," IEEE Xplore, Jul. 23, 2020, 3 pages; https://ieeexplore.ieee.org/document/9144691.

"802.15.6-2012—Part 15.6: Wireless Body Area Networks," IEEE Standard for Local and metropolitan area networks, IEEE Computer Society, Feb. 29, 2012, 271 pages.

* cited by examiner

PRIORITIZED SCHEDULING FOR UWB RANGING

CROSS REFERENCE TO RELATED APPLICATION

This application claims priority to U.S. Provisional Patent Application No. 63/069,917, entitled "Techniques to Prioritize and Schedule Ultra-Wideband (UWB) Ranging in a Wireless Local Area Network (WLAN)," filed Aug. 25, 2020, the entirety of which is incorporated herein by reference.

TECHNICAL FIELD

The present disclosure relates to network equipment and services.

BACKGROUND

Networking architectures have grown increasingly complex in communications environments, particularly mobile networking environments. In some instances, it is useful to determine a mobile device location within a mobile networking environment. While Institute of Electrical and Electronics Engineers (IEEE) 802.11 (e.g., Wi-Fi®) or Bluetooth® ranging techniques may be utilized in some cases to determine mobile device location, such technologies typically provide limited location accuracy.

Ultra-Wideband (UWB), as defined in IEEE 802.15.4a and 802.15.4z, may offer improved ranging accuracy over Bluetooth and Wi-Fi. However, UWB ranging techniques are not designed for scale. For example, UWB ranging procedures generally require all UWB anchors and clients to be on the same channel, which can cause channel saturation and/or signal collisions.

DESCRIPTION OF EXAMPLE EMBODIMENTS

Overview

Figure 1:
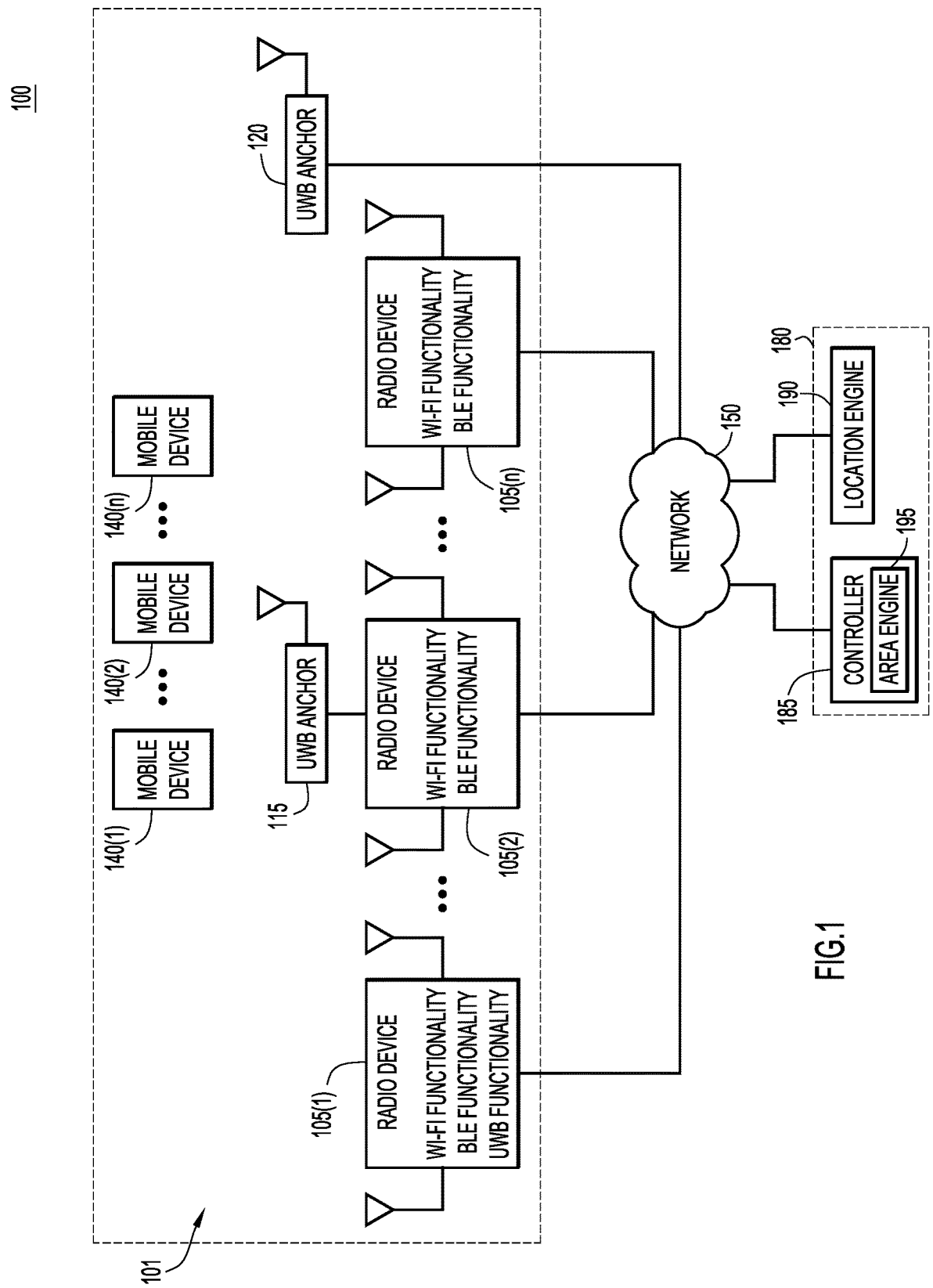
FIG. 1 is a diagram of a system in which techniques for prioritized scheduling for UWB ranging may be implemented, according to an example embodiment.

In one embodiment, a control device can be configured to determine a respective ultra-wide band (UWB) ranging priority for each of a plurality of mobile devices. Each of the mobile devices is assigned to at least one UWB anchor of a plurality of UWB anchors for UWB ranging. The control device can obtain at least one collision mapping identifying, for a respective pair of the mobile devices, a collision probability that a UWB signal associated with a UWB ranging procedure involving a first mobile device of the respective pair of the mobile devices will collide with a UWB signal associated with a UWB ranging procedure involving a second mobile device of the respective pair of the mobile devices. The control device can establish a ranging schedule for the plurality of mobile devices and the plurality of UWB anchors based on the respective UWB ranging priority for each of the plurality of mobile devices, and the at least one collision mapping. The control device can send at least one command to cause UWB ranging procedures to be performed according to the ranging schedule.

EXAMPLE EMBODIMENTS

Presented herein are techniques for scheduling UWB anchors and mobile devices for UWB client ranging. Client ranging can be used, e.g., for detecting and/or tracking a location of a mobile device. Client ranging using a UWB localization technique, i.e., a localization technique involving UWB transmissions, is referred to herein as "UWB ranging." For example, UWB ranging can include time-of-flight (ToF), time-of-arrival (ToA), time-difference-of-arrival (TDoA), received signal strength indicator (RSSI), or other analyses of UWB transmissions. UWB ranging is relatively precise, providing ranging accuracy within about 10 centimeters in line-of-sight (LoS) situations. This level of accuracy is useful for both client-driven and infrastructure-based applications where, for example, Bluetooth Low Energy (BLE) or Wi-Fi-based ranging may provide disappointing results.

However, UWB ranging protocols are not designed for scale. For example, in IEEE 802.15.4a and IEEE 802.15.4z, UWB ranging is specified for one mobile device ranging against only one or a few UWB anchors. Yet, in certain environments, there may be many available UWB anchors, especially when the UWB anchors are installed near access points at ceiling level and in radio frequency (RF) range of one another. Moreover, UWB protocols generally require all UWB anchors and mobile devices to be on the same channel.

In dense deployments, such as conference venues, shopping malls, etc., demands on UWB ranging for a real time location system (RTLS) can exceed the ability of the infrastructure to deliver location information. For example, a radio device that may be optimal for serving as a primary anchor for UWB ranging due to its position in relation to certain mobile devices may be capable of performing only one ranging action at a time. Simultaneous UWB transmission can cause interference problems, for example, if devices are within about 25-30 meters of each other and in line of sight. Moreover, government regulations typically limit an amount of energy that can be spent per minute and/or hour for UWB ranging. It can, therefore, be important to schedule UWB ranging to avoid channel saturation, signal interference, and exhaustion of the energy budget. This is true both for UWB anchors (which may, for example, detect transmissions from many mobile devices but may suffer from collisions with mobile devices ranging against neighboring UWB anchors) and for mobile devices (which may, for example, encounter channel saturation and be prevented from engaging in the ranging exchanges they need for accurate location).

Presented herein are techniques for prioritized scheduling of UWB anchors and mobile devices for UWB client ranging. For example, techniques presented herein may facilitate limiting airtime consumption for UWB ranging by pacing ranging activity based on location, e.g., by slowing down ranging in areas where crowd density is high or movement is reduced and/or predictable, and/or accelerating ranging in other area types. Techniques presented herein also may enable different UWB pacing levels based on client device criticality. For example, techniques presented herein may enable UWB interference between UWB anchors to be avoided, with high priority devices being ranged before other devices, which may be queued according to priority.

In an example embodiment, a space can include a wireless local area network (WLAN) and a plurality of UWB anchor devices. A plurality of mobile devices may be located within the space, each of the mobile devices being movable relative to the UWB anchor devices. A control device associated with the space can be configured to assign an initial set of UWB anchors for client ranging when a mobile device first enters the space, and the control device can be further configured to dynamically change the UWB anchor assignment as appropriate if, and as, the mobile device moves within the space.

The control device can designate one of the UWB anchor devices as a primary UWB anchor and other of the UWB anchor devices as secondary UWB anchors. The primary UWB anchor can communicate with the mobile device to complete a location exchange, while the secondary UWB anchors (which are in RF proximity to the primary UWB anchor) can operate as "receive-only anchors," which passively receive UWB transmissions from the mobile device and from the primary UWB anchor but do not send communications to the mobile device. The secondary UWB anchors can, e.g., report the UWB transmissions, and/or information based on the UWB transmissions, to the control device for processing. For example, each of the secondary UWB anchors can report to a controller of the control device each frame it detects, and to a location engine of the control device, each frame that allows computation of a range/location.

The control device can determine a respective UWB ranging priority for each of the mobile devices. For example, a UWB ranging priority for a particular mobile device may be determined based on one or more attributes established when the mobile device first authenticates to the WLAN. The attributes may include, e.g., a field indicating a relative priority (either directly or indirectly), a device type (e.g., a mobile phone vs. an asset tag, etc.), an operational use case (e.g., indoor wayfinding, asset tracking, etc.), and/or a required ranging interval. For example, a wireless asset tag utilizing continuous or frequent ranging, or ranging at regular intervals, or for critical or high priority equipment, may be designated as a high priority mobile device, while a mobile device for which ranging is not critical, and/or for which ranging may be conducted less frequently, may be designated as a medium or low priority mobile device. It should be appreciated that a graduated index of priority may be defined with any amount of granularity. For example, priority may be designated on a binary scale with only two ("high" or "low") different priority types, a finely granulated scale with several different priority types (such as "low", "medium low", "medium", "medium high", "high", "extremely high", "critical", etc.), or another scale with another number of priority types. If no priority information is available for a particular mobile device, the control device can assign a default, "best effort," or other priority to the mobile device.

The control device can obtain at least one collision mapping identifying, for a respective pair of the plurality of mobile devices, a collision probability that a UWB signal associated with a UWB ranging procedure involving a first mobile device of the respective pair of the plurality of mobile devices (e.g., a UWB signal transmitted to the first mobile device and/or a UWB signal transmitted from the first mobile device) will collide with a UWB signal associated with a UWB ranging procedure involving a second mobile device of the respective pair of the plurality of mobile devices (e.g., a UWB signal transmitted to the second mobile device and/or a UWB signal transmitted from the second mobile device). For example, two mobile devices ranging against a same set of UWB anchors may have a relatively high collision probability if they perform UWB ranging at a same time. In contrast, two mobile devices ranging against only a partially overlapping or non-overlapping set of UWB anchors may have a relatively moderate or low collision probability (with the probability depending on a variety of factors, including a number of common anchors and whether the common anchors are primary or secondary anchors).

The control device can establish a ranging schedule for the plurality of mobile devices and the plurality of UWB anchors based on the respective UWB ranging priority for each of the plurality of mobile devices, and the collision mapping(s). For example, the ranging schedule can enable ranging priority to be provided to higher priority devices in high-density or other environments in which UWB ranging operations involve limited UWB ranging infrastructure resources being demanded by multiple (in some cases, hundreds of) mobile devices. The scheduling may, for example, be configured to prevent signal collisions, which would cause ranging to fail for critical or other high priority devices. For example, the control device can create a ranging schedule for all mobile devices and UWB anchors based on a sorted cascading priority and collision risk.

In an example embodiment, the control device can be configured to determine a preliminary ranging schedule based on the respective UWB ranging priorities and collision mapping(s) and then refine the preliminary ranging schedule to establish a final ranging schedule. For example, the control device may assess, for each particular mobile device—or each particular mobile device of a subset of the mobile devices (e.g., mobile devices having a priority above a predetermined threshold)—whether the particular mobile device has an adequate number of assigned UWB anchor devices and/or adequate triangulation coverage by its assigned UWB anchor devices. If the control device determines that a particular mobile device has a limited (potentially inadequate) number of assigned UWB anchor devices or that the assigned UWB anchor devices are in a limited (potentially inadequate) number of quadrants to enable satisfactory triangulation with respect to the mobile device, the control device can re-compute at least a selected (corresponding) one of the collision mapping(s) to determine an updated collision probability if a UWB transmit power and/or refresh rate is changed. For example, increasing a transmit power for the mobile device may increase a UWB range of the mobile device, thereby allowing the mobile device to reach additional (farther away) UWB anchors; however, increasing range also may increase relative collision probability. The control device may establish the (final) ranging schedule using this updated collision probability information. As may be appreciated, the control device may forego this calculation or have a higher tolerance for reduced anchor coverage for lower priority mobile devices.

The control device can be configured to send at least one command to cause UWB ranging procedures to be performed according to the established ranging schedule. For example, the control device can be configured to provide instructions to the UWB anchors both with respect to timing for ranging by their respective mobile devices and with respect to timing for transmission by the UWB anchors of scheduling instructions to the mobile devices. For each particular one of the UWB anchors, for example, the control device can allocate slots of a frame (also called a "super-frame") to the mobile devices associated with the particular one of the UWB anchors for UWB ranging. The super-frame can be, e.g., a multicast frame, a broadcast frame, or a burst of one or more unicast frames. For example, mobile devices having a higher priority may be assigned exclusively to their own slots of a super-frame, while mobile devices having moderate or lower priorities may be assigned non-exclusively to shared slots of a super-frame. The control device may assign mobile devices to the shared slots, e.g., in an order starting from a lowest collision probability.

In an example embodiment, the control device can be configured to schedule the timing for transmission by the UWB anchors of the scheduling instructions (e.g., the transmission of the super-frames) based on an interference mapping for the UWB anchors. The control device can compute or otherwise obtain the interference mapping identifying which UWB anchors are within UWB interference range of each other. The control device can stagger the timing for transmission of scheduling instructions by any UWB anchors within UWB interference range of each other. For example, the control device can stagger super-frame transmissions by the UWB anchors so UWB transmissions (pulses) involving the UWB anchors do not interfere with each other. The control device may permit UWB anchors that are not within UWB interference range of each other to transmit their super-frames simultaneously.

Turning now to FIG. 1, an example system 100 for prioritized scheduling for UWB ranging within a space 101 can include a plurality of radio devices 105 configured to wirelessly communicate with a plurality of mobile devices 140 via one or more of a variety of different communication technologies. For example, each of the radio devices 105 can be configured to communicate using any radio access technology, such as Wi-Fi, Bluetooth, Bluetooth Low Energy (BLE), IEEE 802.15.4 (low-rate wireless personal area networks (LR-WPANs)), etc. Each of the radio devices 105 may or may not include UWB functionality.

In an example embodiment, each of the radio devices 105 includes an access point or other radio or network device configured to facilitate a communication involving one or more mobile devices (such as mobile devices 140). For example, the radio devices 105 can include one or more access points configured to facilitate communication between one or more of the mobile devices 140 and a network 150. Access points are sometimes referred to herein as "APs" or "WLAN access points."

Each of the radio devices 105 can communicate with (i.e., send transmissions to, and/or receive transmission from) one or more of the mobile devices 140 using a relatively short-range wireless local area communication technology, such as (but not limited to) Wi-Fi WLAN, BLE, and/or UWB. For example, radio device 105(1) includes built-in/integrated Wi-Fi functionality for communicating with one or more of the mobile devices 140 over Wi-Fi WLAN, BLE functionality for communicating with one or more of the mobile devices 140 over BLE, and UWB functionality for communicating with one or more of the mobile devices 140 over UWB. Radio device 105(2) includes built-in/integrated Wi-Fi functionality and BLE functionality but not UWB functionality. However, radio device 105(2) is configured to achieve UWB functionality via a separate, peripheral UWB anchor device 115 connected to radio device 105(2). For example, the UWB anchor device 115 can be embodied in a peripheral device connected to radio device 105(2) via a universal serial bus (USB) dongle, a time-synchronized network (TSN) connection, or another connection technology now known or hereinafter developed. Radio device 105(n) also does not include built-in/integrated UWB functionality, and is not connected to any peripheral UWB anchor device. Therefore, radio device 105(n) is not configured to achieve UWB functionality.

Each of the mobile devices 140 can include any mobile device or other object capable of over-the-air RF communications utilizing wireless local area communication technologies such as (but not limited to) Wi-Fi WLAN, BLE, and UWB. Each of the mobile devices 140 also may be capable of over-the-air RF communications utilizing one or more wireless wide area communication technologies such as Third Generation Partnership Project (3GPP) communication technologies (e.g., Fourth Generation (4G)/Long Term Evolution (LTE), Fifth Generation (5G), etc.). For example, each of the mobile devices 140 can include a mobile wireless phone, computer, tablet, smart glasses, Augmented Reality tool, an electronic tag (which may, e.g., be coupled to, or associated with, an electronic or non-electronic object), or another device or object now known or hereinafter developed. A mobile device is sometimes referred to herein as a "client," "station," or "STA."

Each of the mobile devices 140 is configured to communicate with one or more of the radio devices 105. For example, each of the mobile devices 140 may include Wi-Fi WLAN functionality for communicating with one or more of the radio devices 105 over Wi-Fi WLAN, BLE functionality for communicating with one or more of the radio devices 105 over BLE, and/or UWB functionality for communicating with one or more of the radio devices 105 over UWB (either directly or via a peripheral UWB anchor device 115).

The mobile devices 140 also may be configured to communicate over UWB with one or more standalone UWB anchor devices 120. A standalone UWB anchor device 120 includes functionality for receiving (and potentially also sending and/or processing) UWB transmissions without being connected to, or integrated with, a radio device 105. Each standalone UWB anchor device 120 also may include other communication capabilities, such as BLE wireless communication capabilities and/or wired communication capabilities, e.g., via a connection to a network (such as network 150) over IEEE 802.11, Ethernet, or another connection mechanism now known or hereinafter developed.

The terms "UWB anchor" and "anchor" are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to a radio device 105(2), and/or a radio device 105(1) with UWB functionality. As would be appreciated by a person of ordinary skill in the art, while a UWB anchor can include a radio device 105, not all UWB anchors include radio devices 105, and not all radio devices 105 constitute UWB anchors.

It should be appreciated that the number, type, and arrangement of the radio devices 105, mobile devices 140, peripheral anchor devices 115, standalone UWB anchor devices 120, and UWB anchors, and their respective connectivity configurations and capabilities, are illustrative and can vary in alternative example embodiments.

The radio devices 105, peripheral UWB anchor device 115, standalone UWB anchor device 120, and mobile devices 140 are configured to communicate with a control device 180 via the network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location engine 190. The controller 185 includes hardware and/or software that is configured to manage operation of the radio devices 105. For example, the controller 185 may be a WLAN controller (WLC) configured to facilitate certain communications involving one or more of the mobile devices 140 through one or more of the radio devices 105. The controller 185 further includes an AREA engine 195 configured to cooperate with the location engine 190 to enable UWB ranging for the mobile devices 140. In one form, the controller 185 and the location engine 190 may be separate and physically distinct entities. Alternatively, at least certain of the features and/or functionality of the controller 185 and location engine 190 may be integrated into a single entity, certain of the features and/or functionality described herein in connection with the controller 185 may be included in, and/or performed by, the location engine 190, and/or certain of the features and/or functionality described herein in connection with the location engine 190 may be included in, and/or performed by, the controller 185.

The location engine 190 includes hardware and/or software that is configured to manage location-related transmissions involving the radio devices 105, peripheral UWB anchor device 115, standalone UWB anchor device 120, and/or mobile devices 140. For example, the location engine 190 can be configured to cooperate with the controller 185, radio devices 105, peripheral UWB anchor device 115, standalone UWB anchor device 120, and/or mobile devices 140 to initiate and complete client ranging procedures within the space 101, e.g., by assigning and/or instructing one or more of the radio devices 105, peripheral UWB anchor device 115, and/or standalone UWB anchor device 120 to complete client ranging procedures with respect to one or more of the mobile devices 140. For example, the location engine 190 can be configured so that, when a mobile device 140 enters the space 101, the location engine 190 assigns one of the radio devices 105, peripheral UWB anchor device 115, or standalone UWB anchor device 120 as a primary anchor for engaging in a location exchange with the mobile device 140 and other(s) of the radio devices 105, peripheral UWB anchor device 115, and/or standalone UWB anchor device 120 as secondary anchors for passively receiving transmissions from the mobile device 140 and transmissions from the primary UWB anchor for location processing. The location engine 190 can be further configured to cooperate with the controller 185, radio devices 105, peripheral UWB anchor device 115, standalone UWB anchor device 120, and/or mobile devices 140 to dynamically change the UWB anchor assignment as appropriate if, and as, the mobile devices 140 move within the space 101.

The space 101 can include any indoor or outdoor area, such as a home, school, campus, office building, conference center, stadium, or other venue or location or portion thereof. The space 101 may support any density of mobile devices 140. The location engine 190 can be configured to assign anchors so that accurate client ranging is enabled for each of the mobile devices 140 regardless of density. For example, for a particular mobile device 140, the location engine 190 can select an optimal set of anchors for client ranging from all available radio devices 105, peripheral UWB anchor devices 115, and/or standalone UWB anchor devices 120 in the space 101.

The location engine 190 can be configured to coordinate client ranging procedures involving any of a variety of different localization techniques. In an example embodiment, the location engine 190 can be configured to coordinate client ranging procedures involving one or more UWB localization techniques, such as ToF, ToA, TDoA, RSSI, or another technique involving analysis of UWB transmissions, and/or one or more non-UWB localization techniques, such as lateration, AoA, or another technique that does not involve UWB transmissions. For example, the location engine 190 can establish an initial set of anchor assignments for a mobile device 140 by estimating a coarse location for the mobile device 140 using a non-UWB localization technique and selecting an optimal set of UWB anchor points for UWB ranging based on the coarse location, and can then use the selected UWB anchor points to determine more precise location information for the mobile device 140 using one or more UWB localization techniques. The location engine 190 also can cooperate with the controller 185 to change anchor assignments as appropriate if and as the mobile device 140 moves through the space 101, e.g., using a relative collision tolerance mapping for UWB anchors in the space 101. Thus, the location engine 190 may limit UWB ranging to selected UWB anchor points, potentially reducing a likelihood of channel saturation and/or signal collisions relative to a configuration in which UWB ranging involves all available or nearby UWB anchor points.

The location engine 190 can include logic for performing one or more location computations based on the localization techniques. For example, the location engine 190 can process time, distance, angle, signal strength, and/or other information from one or more of the radio devices 105, peripheral UWB anchor devices 115, standalone UWB anchor devices 120, and/or mobile devices 140 to determine and/or track a location of a particular one of the mobile devices 140. The location engine 190 can be configured to return results of that processing to the particular one of the mobile devices 140, e.g., through one or more of the radio devices 105, or to some other entity seeking that location information, if so desired. In addition, or in the alternative, the radio devices 105, peripheral anchor devices 115, standalone UWB anchor devices 120, and/or mobile devices 140 can be configured to perform certain location computations and, potentially, to report results from those computations to the location engine 190.

In an example embodiment, the control device 180 is further configured, e.g., at the controller 185 and/or location engine 190, to establish a ranging schedule for all of mobile devices 140 and UWB anchors. For example, the control device 180 can determine respective UWB ranging priorities for the mobile devices 140, obtain at least one collision mapping for the mobile devices 140, and establish a ranging schedule for the mobile devices 140 and UWB anchors based on the respective UWB ranging priorities and the collision mapping(s). A respective UWB ranging priority for a particular mobile device 140 may be based, for example, on one or more attributes established when the particular mobile device 140 authenticates to the network 150. For example, a mobile device 140 that requires continuous or frequent ranging, or ranging for critical equipment, may have a higher UWB ranging priority than a mobile device 140 for which ranging is required less frequently or for less critical equipment. Each collision mapping can identify, for a respective pair of the mobile devices 140, a collision probability that a UWB signal associated with a ranging procedure involving a first mobile device of the respective pair of mobile devices 140 will collide with a UWB signal associated with a ranging procedure involving a second mobile device of the respective pair of mobile devices 140. For example, the control device 180 can create the ranging schedule based on a sorted cascading UWB ranging priority and collision risk.

The sorting can involve consideration of a number of different factors, including, for example: a number of ranging operations completed since a last location update; a required update interval (e.g., based on a use case of the mobile device 140(i), which may or may not be established at onboarding of the mobile device 140(i)); a required number of anchors per location update; a distance or RSSI a mobile device 140(i) is from an anchor that shows they are within RF range of each other, etc. For example, prioritization may be performed using the following logic:

TlastRanging(anchor i, mobile device i)=time elapsed since last ranging between anchor i and mobile device i Tinterval(mobile device i)=update interval required for mobile device i ratioOfIntervalSinceLastRanging(anchor i, mobile device i)=TlastRanging(anchor mobile device i)/Tinterval (mobile device i)

rssi(anchor i, mobile device i)=rssi between anchor i and mobile device i rssiAve(mobile device i)=average (rssi(:,mobile device i))

isCurrent(anchor i, mobile device i)=ratioOfIntervalSinceLastRanging(anchor mobile device i)<=1 nCurrent(mobile device i)=sum(isCurrent(:, mobile device i);

isInRange(anchor i, mobile device i)=can anchor i and mobile device i successfully exchange two-way ranging (TWR)

% alpha1=getAlphaFromNumberCurrentAnchors(nCurrent(mobile device i)); this is a weighting based on whether a particular mobile device 140(i) already has enough anchors. For example, if there are already enough anchors providing ranging for a particular mobile device 140(i), then the mobile device 140(i) may be deemed a lower priority than other mobile devices 140(n) without adequate anchor coverage.

% alpha2=isInRange(anchor i, mobile device i); this is a weighting based on whether a particular mobile device 140(i) is within RF range of a particular anchor. For example, if the mobile device 140(i) is within range of the anchor, alpha2 could be 1 and, otherwise, 0, so that a matching of the particular mobile device 140(i) and the particular anchor (that are out of range with one another) is not prioritized.

% alpha3=getAlphaFromRssi(rssi(anchor i, mobile device i), rssiAve(mobile device i)); this is a weighting based on relative distance between a particular anchor and a particular mobile device 140(i). For example, a higher weighting (prioritization) may be provided for an anchor that is located closer to a mobile device 140(i).

% alpha4=ratioOfIntervalSinceLastRanging(anchor i, mobile device i); this is a weighting based on time since particular anchor/mobile device pairs have ranged. For example, a higher weighting (prioritization) may be provided for anchor/mobile device pairs that have not ranged recently.

It should be understood that the above logic, and the factors considered therein, are illustrative and additional, less, or different factors may be considered, with additional, less, or different weightings, in various different embodiments.

The control device 180 also may be further configured, e.g., at the controller 185 and/or location engine 190, to manage, not only UWB ranging assignments and schedules, but also a speed/frequency at which ranging is to occur and/or a budget allowed for the ranging. As may be appreciated by a person of ordinary skill in the art, there is a counter-intuitive relationship between modulation complexity and distance when using UWB. When a simple modulation with frequent pulse repetition and long preamble and burst durations is used, the transmission may have a greater range than if a more complex scheme (where, e.g., the receiver has a shorter preamble training time and less frequent pulse repetitions) is used. However, frames with robust modulation schemes take longer to transmit and, thus, consume more power per unit of time (e.g., per second). As UWB is typically regulated around a maximum amount of energy transmitted per unit of time, a choice of a stronger modulation may cause a system to either reduce the number of frames per second or reduce the energy of frames transmitted. An alternative is to increase the modulation complexity, thereby reducing the frame duration and allowing an increased transmit power. Therefore, the signal may be received by farther-away anchors and, at the same time, because the signal is received by farther-away anchors, the density of the devices transmitting at the same time is increased because each of their signals is shorter in time duration.

The control device 180 can be configured to balance these considerations when making anchor assignments and schedules, and providing UWB ranging instructions. In particular, the control device 180 (e.g., at the controller 185 and/or location engine 190) can be configured to evaluate a collision risk for a mobile device (such as the mobile device 140), both with respect to other nearby devices and with respect to other devices located farther away. For example, if a mobile device 140 is instructed to transmit a stronger signal (because it is in a location where there are not many UWB anchors, for example), then the signal will reach farther and, therefore, be more likely to collide with signals involving other mobile devices 140. On the other hand, if the modulation used by the mobile device 140 is more complex, its signal may not be demodulated by another distant ranging device, and the signal may, therefore, simply act as a non-disruptive noise floor increase. Such collisions may be less likely to be disrupting other mobile devices 140 in a certain area of the space 101, for example.

In an example embodiment, the control device 180 can be configured to determine a preliminary ranging schedule based on the respective UWB ranging priorities for the mobile devices 140, and the collision mapping(s), and then refine the preliminary ranging schedule to establish a final ranging schedule. For example, the control device 180 may assess, for each particular mobile device—or each particular mobile device of a subset of the mobile devices 140 (e.g., mobile devices having a priority above a predetermined threshold)—whether the particular mobile device has an adequate number of assigned UWB anchor devices and/or adequate triangulation coverage by its assigned UWB anchor devices. If the control device 180 determines that a particular mobile device has a limited (potentially inadequate) number of assigned UWB anchor devices or that the assigned UWB anchor devices are in a limited (potentially inadequate) number of quadrants to enable satisfactory triangulation with respect to the particular mobile device, the control device 180 can re-compute at least a selected (corresponding) one of the collision mapping(s) to determine an updated collision probability if a UWB transmit power and/or refresh rate is changed for the particular mobile device. For example, increasing transmit power may increase a UWB range of the mobile device, thereby allowing the mobile device to reach additional (farther away) UWB anchors; however, increasing range also may increase relative collision probability. The control device 180 may establish the (final) ranging schedule using this updated collision probability information. As may be appreciated, the control device 180 may forego this calculation or have a higher tolerance for reduced anchor coverage for lower priority mobile devices 140.

The control device 180 can be configured to send at least one command to cause UWB ranging procedures to be performed according to the established ranging schedule. For example, the control device 180 can be configured to provide instructions to the UWB anchors both with respect to timing for ranging by their respective mobile devices 140, and with respect to timing for transmission by the UWB anchors of scheduling instructions to the mobile devices 140. Example operations for establishing the ranging scheduling, transmission of ranging scheduling instructions, and commanding UWB procedures are described in more detail below.

Though illustrated in FIG. 1 as discrete components, and as explained above, it should be appreciated that the controller 185 and location engine 190 may be integrated or otherwise reconfigured in any number of different components without departing from the spirit and scope of the embodiments presented herein.

Figure 2:
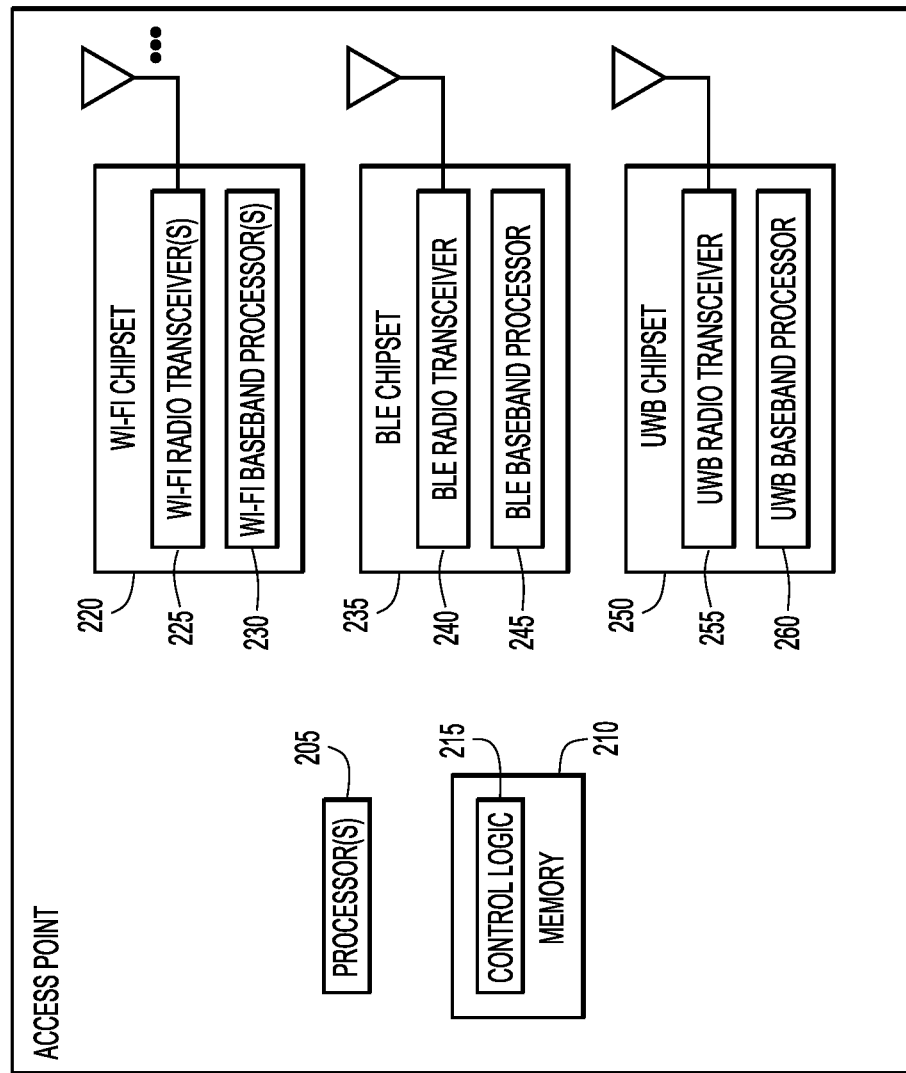
FIG. 2 is a block diagram of an access point configured to participate in the techniques presented herein, according to an example embodiment.

FIG. 2 is a block diagram of an access point 200, according to an example embodiment. The access point 200 includes a Wi-Fi chipset 220 for providing Wi-Fi functionality, a BLE chipset 235 for providing BLE functionality, and a UWB chipset 250 for providing UWB functionality. The Wi-Fi chipset 220 includes one or more Wi-Fi radio transceivers 225 configured to perform Wi-Fi RF transmission and reception, and one or Wi-Fi baseband processors 230 configured to perform Media Access Control (MAC) and physical layer (PHY) modulation/demodulation processing. The BLE chipset 235 includes a BLE radio transceiver 240 configured to perform BLE RF transmission and reception, and a BLE baseband processor 245 configured to perform BLE baseband modulation and demodulation. The UWB chipset 250 includes a UWB radio transceiver 255 configured to perform UWB RF transmission and reception, and a UWB baseband processor 260 configured to perform UWB baseband modulation and demodulation. For example, the Wi-Fi chipset 220, BLE chipset 235, and UWB chipset 250 may be implemented in one or more application-specific integrated circuits (ASICs), field-programmable gate arrays (FPGAs) or other digital logic embodied in one or more integrated circuits.

The access point 200 includes one or more processors 205, which may embody or include one or more microprocessors and/or microcontrollers. In addition, the access point 200 includes a memory 210 that stores control logic 215. The processor(s) 205 are configured to execute instructions of the control logic 215 to execute various control functions for the access point 200.

As would be understood by a person of ordinary skill in the art, the features and functionality of the access point 200 are illustrative and can vary in alternative example embodiments. For example, the access point 200 may include more, less, or different chipsets in alternative example embodiments. In particular, the access point 200 may not include the Wi-Fi chipset 220 if the access point 200 does not include Wi-Fi functionality; the access point 200 may not include the BLE chipset 235 if the access point 200 does not include BLE functionality; and the access point 200 may not include the UWB chipset 250 if the access point 200 does not include UWB functionality. In addition, as would be recognized by a person of ordinary skill in the art, the access point 200 may include one or more additional components, such as a network interface to provide an IEEE 802.11 connection, Ethernet connection, or other connection, which are not depicted in FIG. 2 for purposes of simplicity.

Figure 3:
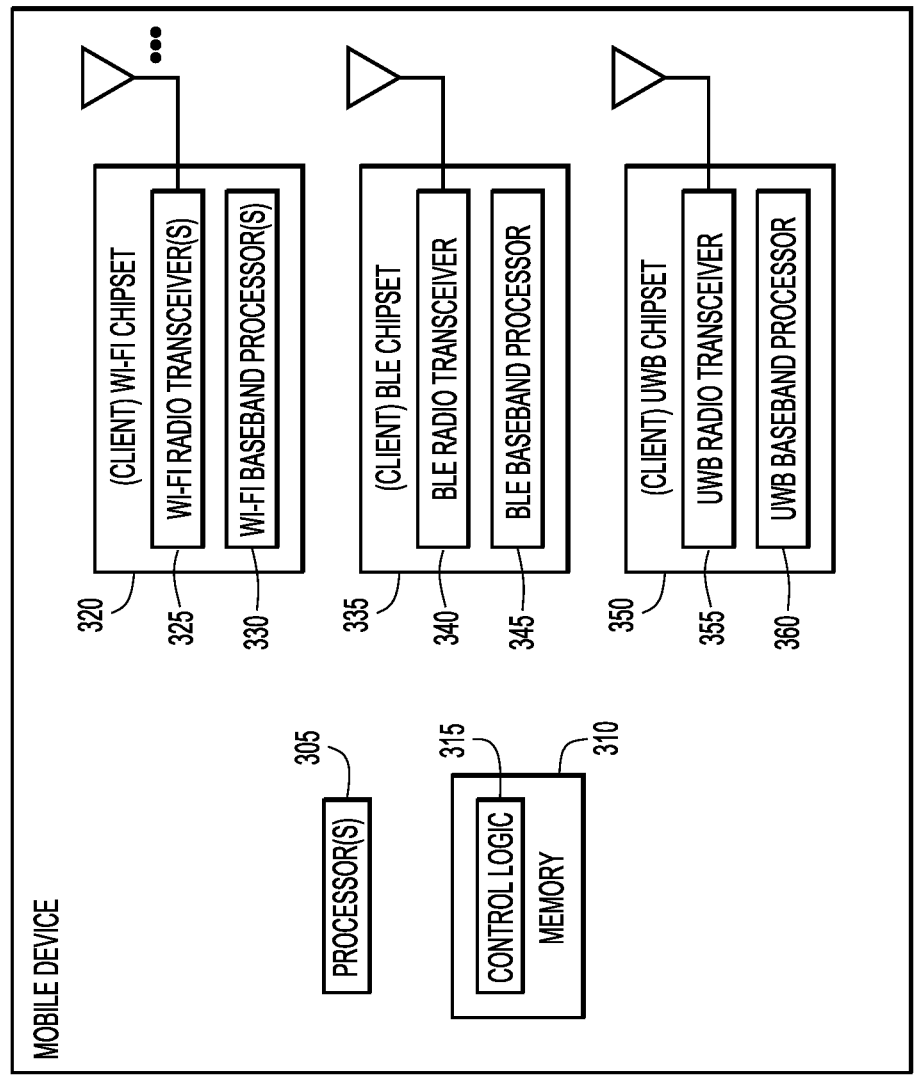
FIG. 3 is a block diagram of a mobile device configured to participate in the techniques presented herein, according to an example embodiment.

FIG. 3 is a block diagram of a mobile device 300, according to an example embodiment. As would be appreciated by a person of ordinary skill in the art, the mobile device 300 includes chipsets similar to the chipsets of an access point, though with configurations for client-side operations and mobile device/battery-powered use cases. In particular, as with the access point 200 described above in connection with FIG. 2, the mobile device 300 includes a Wi-Fi chipset 320 for providing Wi-Fi functionality, a BLE chipset 335 for providing BLE functionality, and a UWB chipset 350 for providing UWB functionality, with the Wi-Fi chipset 320 including one or more Wi-Fi radio transceivers 325 and one or Wi-Fi baseband processors 330, the BLE chipset 335 including a BLE radio transceiver 340 and a BLE baseband processor 345, and the UWB chipset 350 including a UWB radio transceiver 355 and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the access point 200 depicted in FIG. 2, the mobile device 300 can include more, less, or different components in alternative example embodiments.

Figure 4:
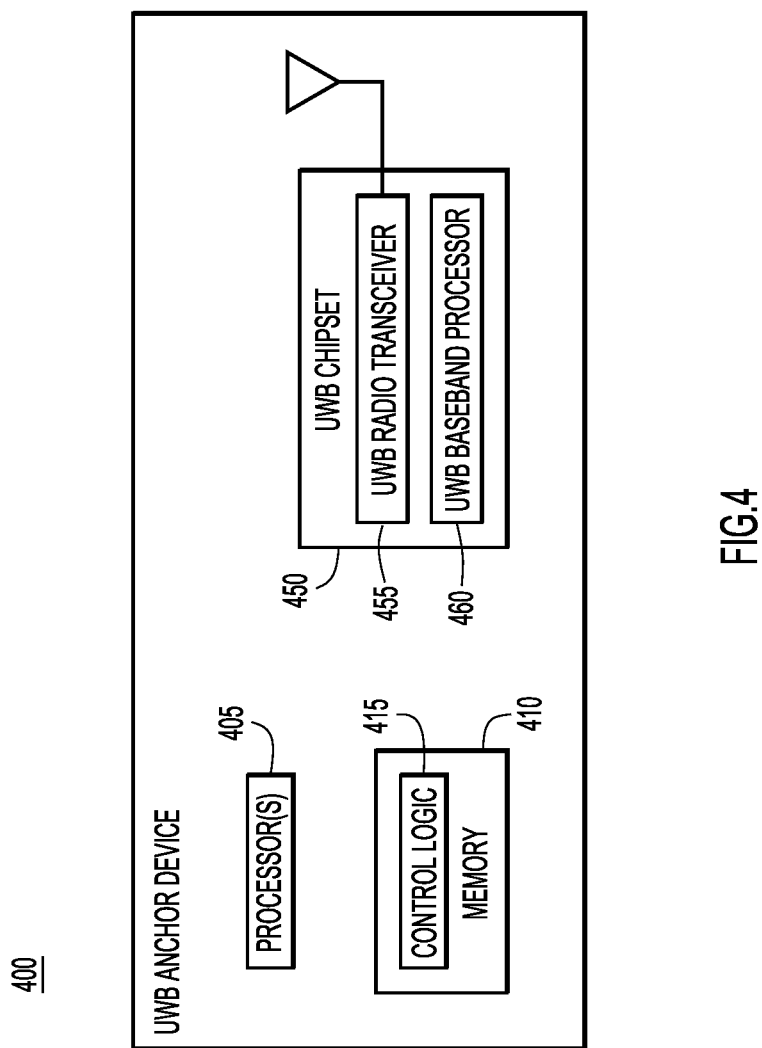
FIG. 4 is a block diagram of a UWB anchor device configured to participate in the techniques presented herein, according to an example embodiment.

FIG. 4 is a block diagram of a UWB anchor device 400, according to an example embodiment. The UWB anchor device 400 can be, for example, a standalone UWB anchor device or a peripheral UWB anchor device. Accordingly, the UWB anchor device 400 may include some, but not all, of the features depicted in FIGS. 2 and 3 for example access point 200 and mobile device 300, respectively. In particular, while the UWB anchor device 400 includes a UWB chipset 450 (with a UWB radio transceiver 455 and UWB baseband processor 460), as well as one or more processors 405 (e.g., microprocessor(s) and/or microcontroller(s)) and a memory 410 that stores control logic 415, the UWB anchor device 400 does not include a Wi-Fi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, a radio device, such as the access point 200, which may include the same or different components than those depicted in the UWB anchor device 400 of FIG. 4.

Figure 5:
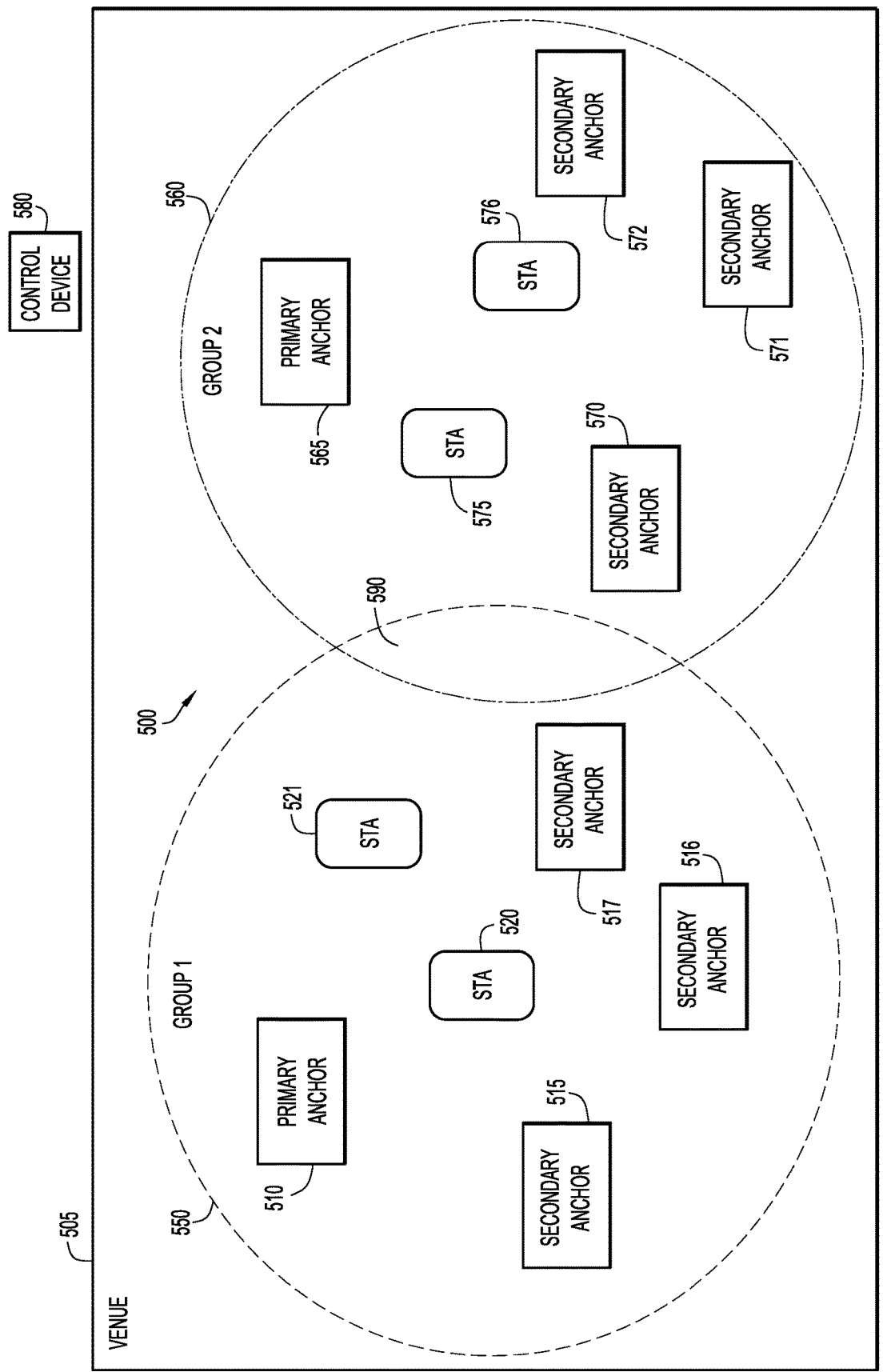
FIG. 5 is a diagram illustrating an interference map generated by techniques presented herein, as part of prioritized scheduling for UWB ranging, according to an example embodiment.

Turning now to FIG. 5 an example operation for prioritized scheduling for UWB ranging is now described with reference to an interference mapping 500 involving multiple mobile devices (STA 520, STA 521, STA 575, and STA 576) disposed within a venue 505. The venue 505 includes any indoor or outdoor area, such as a home, school, campus, office building, conference center, stadium, or other venue or location or portion thereof. Each of the mobile devices (STA 520, STA 521, STA 575, and STA 576) has been assigned (e.g., by a control device 580 associated with the venue 505) to corresponding primary and secondary anchors for UWB ranging. In particular, a first group of mobile devices—Group 1, which includes STA 520 and STA 521—have each been assigned to primary anchor 510 and secondary anchors 515, 516, and 517, and a second group of mobile devices—Group 2, which includes STA 575 and STA 576—have each been assigned to primary anchor 565 and secondary anchors 570, 571, and 572. In this context, a "group" is defined as one or more mobile devices that are assigned for UWB ranging to a same primary anchor. As described above, each of the primary and secondary anchors can achieve UWB functionality either by including built-in/integrated UWB functionality or by being connected to a peripheral UWB anchor device or other device with UWB functionality.

The interference mapping 500 identifies which UWB anchors in the venue 505 are within UWB interference range of each other. The control device 580 can compute or otherwise obtain the interference mapping 500. For example, the control device 580 can instruct each primary UWB anchor in the venue 505 (including primary anchor 510 and primary anchor 565) to send a multicast frame, which can be used for purposes of creating the interference mapping 500 and potentially also for group determination purposes and/or time synchronization or other purposes. In an example embodiment, each receiving anchor (e.g., secondary anchors 515-517 and 570-572) can receive and/or demodulate any UWB transmissions within their range and forward to the control device 580 received frame signal level, emitted source, and/or other information, which the control device 580 can use to create the interference mapping 500.

In the example interference mapping 500 depicted in FIG. 5, Group 1 has an interference range (or "bubble") 550, and Group 2 has an interference bubble 560. The interference bubbles 550 and 560 overlap in a region 590, indicating that there is a potential for signal interference between Group 1 and Group 2 in the region 590. As may be appreciated by a person of ordinary skill in the art, when multiple signals are received by a receiving anchor at a same time, disruptive interference may exist. For example, the ability of one signal to disrupt another signal may depend on a relative signal level between the signals. An interference mapping, such as the interference mapping 500, may allow the control device 580 to determine which anchors are potentially within interference range of each other so that UWB ranging can be scheduled to avoid such interference.

The control device 580 may compute the interference mapping 500, for example, based on static and standard transmission settings communicated to the mobile devices (e.g., STA 520, STA 521, STA 575, and STA 576) via a BLE broadcast system for defining preamble type, modulation, etc. For example, a mobile device (e.g., STA 520, STA 521, STA 575, or STA 576) may discover a primary anchor (e.g., primary anchor 510 or primary anchor 565) via a BLE broadcast transmission from the primary anchor or via a unicast transmission to the mobile device. The unicast transmission may be sent, for example, using BLE or Wi-Fi and may include a universally unique identifier (UUID) with broadcast ranging instructions and/or information, such as (but not limited to) a UWB channel number coded over 4 bits, ranging duration in seconds over 4 bits, ranging end mode, and/or target primary UWB anchor MAC address. The UUID can be short (e.g., 2 bytes) or long (e.g., 16 bytes), depending on the implementation.

In some instances, a mobile device (e.g., STA 520, STA 521, STA 575, or STA 576) may send a pairing query to a BLE MAC of an anchor (e.g., primary anchor 510 or primary anchor 565), and a secure session can be established between the mobile device and the anchor. Within the session, the anchor can provide via unicast transmissions to the mobile device various UWB parameters, such as preamble type, expected modulation, etc., and the anchor can obtain the mobile device MAC address. Techniques herein may enhance use of unicast BLE transmissions to a mobile device. More detailed information regarding example BLE broadcast assignments, which may be included in example embodiments, is provided below with reference to FIGS. 7 and 8.

As would be understood by a person of ordinary skill in the art, the features, structure, layout, and design of the interference mapping 500 are illustrative and can vary in alternative example embodiments. For example, the interference mapping 500 can include more or less details regarding the venue 505, mobile devices (STA 520, STA 521, STA 575, and STA 576), primary anchors (510 and 565), secondary anchors (515-517 and 570-572), the groups (Group 1 and Group 2), the interference bubbles (550 and 560), and the region 590, and their respective locations, settings, or other features, in alternative example embodiments. In addition, the interference mapping 500 could constitute a collection of data in a form other than the form depicted in FIG. 5, such as one or more tables, charts, etc., which may or may not include a "map" or other diagram/drawing visually representing the venue 505, mobile devices (STA 520, STA 521, STA 575, and STA 576), primary anchors (510 and 565), secondary anchors (515-517 and 570-572), groups (Group 1 and Group 2), interference bubbles (550 and 560), region 590, etc. Moreover, it should be appreciated that the number, type, and arrangement of the mobile devices (STA 520, STA 521, STA 575, and STA 576), primary anchors (510 and 565), secondary anchors (515-517 and 570-572), groups (Group 1 and Group 2), interference bubbles (550 and 560), region 590, etc., are illustrative and can vary in alternative example embodiments. For example, it should be appreciated that more or less than two mobile devices may be included in each group, more or less than two primary anchors may be included in the venue 505, more or less than three secondary anchors may be assigned for each mobile device, different mobile devices may be assigned to different numbers of anchors, etc.

In an example embodiment, the control device 580 can be configured to establish a UWB ranging schedule based on the interference mapping 500, relative UWB ranging priorities for the mobile devices (STA 520, STA 521, STA 575, and STA 576), and/or one or more collision mappings for the mobile devices. For example, the control device 580 can schedule ranging in response to requests from the mobile devices and/or requests from an RTLS or other application. An RTLS application may include in the request, for example, a frequency with which a particular mobile device and/or a particular type of mobile device should be ranged.

By default, if there are several mobile devices (e.g., hundreds of mobile devices) in an area, several cycles may be required to perform ranging for all of the mobile devices. The control device 580 can be configured to implement a prioritized ranging schedule for each mobile device in a given group (e.g., Group 1, Group 2, etc.). For example, the ranging schedule may be created based on relative UWB ranging priorities of the mobile devices and/or a frequency with which each mobile device is to be ranged.

The control device 580 can determine the relative UWB ranging priorities for the mobile devices via any of a variety of different techniques. In an example embodiment, the control device 580 can determine a relative UWB ranging priority for a particular mobile device (e.g., STA 520, STA 521, STA 575, or STA 576), at least in part, based on one or more attributes established when the mobile device first authenticates to a WLAN associated with the control device 580. For example, the attributes may include one or more remote authentication dial-in user service (RADIUS) or other attributes provided by an authentication server, such as an authentication, authorization, and accounting (AAA) server, which may be included in, or associated with, the control device 580.

The attributes may include, e.g., a field indicating a relative priority (either directly or indirectly), a device type (e.g., a mobile phone vs. an asset tag, etc.), an operational use case (e.g., indoor wayfinding, asset tracking, etc.), and/or a required ranging interval. For example, a wireless asset tag utilizing continuous or frequent ranging, or ranging at regular intervals, or for critical or high priority equipment, may be designated as a high priority mobile device, while a mobile device for which ranging is not critical and/or for which ranging may be conducted less frequently, may be designated as a medium or low priority mobile device. It should be appreciated that a graduated index of priority may be defined with any amount of granularity. For example, priority may be designated on a binary scale with only two ("high" or "low") different priority types, a finely granulated scale with several different priority types (such as "low", "medium low", "medium", "medium high", "high", "extremely high", "critical", etc.), or another scale with another number of priority types. If no priority information is available for a particular mobile device, the control device 580 can assign a default, "best effort," or other priority to the mobile device.

For each ranging group (e.g., Group 1 or Group 2), the control device 580 may rank mobile devices in order of relative UWB ranging priority. If there are more mobile devices in a group than can be supported by the infrastructure (e.g., more than 128 or another threshold number), higher priority mobile devices may be given precedence. Each mobile device (e.g., STA 520, STA 521, STA 575, or STA 576) may be identified by its MAC address, obtained as discussed above for the unicast operations. In addition, or in the alternative, each mobile device may be preconfigured with a virtual MAC address matching a device category (e.g., security staff—>0x8C01; building maintenance—>0x8C02, etc.) in which the address can be inserted while provisioning the mobile device or a ranging application for the mobile device.

Upon determining the relative UWB ranging priorities of the mobile devices, the control device 580 has a list of (or otherwise knows) all mobile devices expected to be ranging in a given area, along with their relative ranging priorities and approximate zones of presence (e.g., ranging group). The control device 580 can use this information along with a collision mapping to establish a prioritized UWB ranging schedule. For example, the control device can establish a collision mapping for each mobile device based on an estimated location of the mobile device and UWB transmission characteristics.

In general, a collision mapping identifies, for a respective pair of a plurality of mobile devices, a collision probability that a UWB signal associated with a UWB ranging procedure involving a first mobile device of the respective pair of the plurality of mobile devices (e.g., a UWB signal transmitted to the first mobile device and/or a UWB signal transmitted from the first mobile device) will collide with a UWB signal associated with a UWB ranging procedure involving a second mobile device of the respective pair of the plurality of mobile devices (e.g., a UWB signal transmitted to the first mobile device and/or a UWB signal transmitted from the first mobile device). For example, the collision mapping can leverage a geometric collision map (GCM), distances between respective stations, relative signal strengths, relative signal complexities, and/or other information. Similar to the interference mapping 500, a GCM identifies, for a particular UWB anchor, other UWB anchors that have each detected at least one mobile device-to-anchor exchange involving the particular UWB anchor over a period of time. Thus, the GCM indicates (e.g., on a map, for each square of a grid, or otherwise) what ranging against any possible UWB anchor might mean in terms of detections by/from other UWB anchors. For example, an AREA engine of the control device 580 may be configured to compute a GCM for each anchor and detected ranging exchange in the venue 505.

Figure 6:
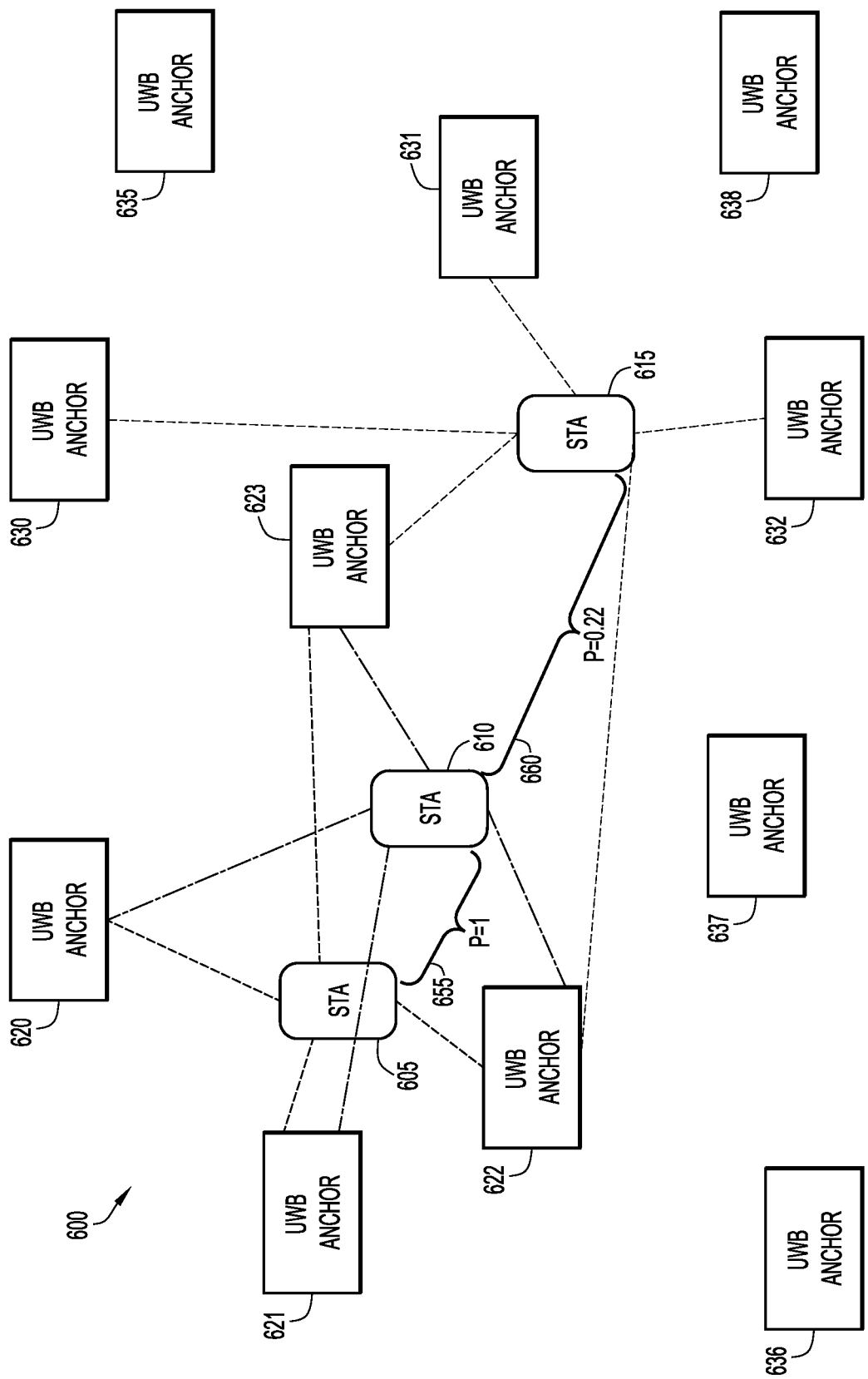
FIG. 6 is a diagram depicting a collision mapping generated by techniques presented herein, as part of prioritized scheduling for UWB ranging, according to an example embodiment.

FIG. 6 is a diagram illustrating a collision mapping 600, according to an example embodiment. The collision mapping 600 includes collision probability information for a first mobile device (STA 605), a second mobile device (STA 610), and a third mobile device (STA 615). STA 605 is ranging against a set of UWB anchors including UWB anchors 620, 621, 622, and 623; STA 610 is ranging against a same set of UWB anchors (i.e., UWB anchors 620, 621, 622, and 623); and STA 615 is ranging against another set of UWB anchors including UWB anchors 622, 623, 630, 631, and 632. For example, for the first set of UWB anchors, one of the UWB anchors 620-623 may be operating as a primary anchor and others of the UWB anchors 620-623 may be operating as secondary anchors, and, for the second set of UWB anchors (i.e., the set of UWB anchors for STA 615), one of the UWB anchors 622, 623, 630, 631, and 632 may be operating as a primary anchor and others of the UWB anchors 622, 623, 630, 631, and 632 may be operating as secondary anchors. Thus, STA 610 is ranging against an identical set of anchors as STA 605 and a partially overlapping set of anchors as STA 615. Other anchors, including anchors 635, 636, 637, and 638 are not actively involved in UWB ranging for STA 605, STA 610, or STA 615.

The collision mapping 600 shows a collision probability 655 of 1.0 that a UWB signal associated with a UWB ranging procedure involving STA 605 will collide with a UWB signal associated with a UWB ranging procedure involving STA 610. For example, there could be a collision probability 655 of 1.0 if STA 605 sends and/or receives a UWB signal at a same time that STA 610 sends and/or receives a UWB signal. The collision mapping 600 further shows a collision probability 660 of 0.22 that a UWB signal associated with a UWB ranging procedure involving STA 610 will collide with a UWB signal associated with a UWB ranging procedure involving STA 615. For example, there could be a collision probability 660 of 0.22 if STA 610 sends and/or receives a UWB signal at a same time that STA 615 sends and/or receives a UWB signal. Thus, as would generally be expected, the collision mapping 600 shows that a collision probability 655 for mobile devices ranging against a same set of anchors is higher than a collision probability 660 for mobile devices ranging against a partially overlapping set of anchors.

As may be appreciated, the collision probabilities presented in the collision mapping 600 are illustrative and actual probabilities may vary based on a number of factors including, e.g., a number of common anchors and whether the common anchors are primary or secondary anchors. For example, a collision probability may be relatively low if there are few or no overlapping anchors. However, this is not absolute, as other factors, such as relative signal strengths, signal complexities, and physical distances for the various devices may increase or decrease collision probability. A control device (such as control device 180 or control device 580 described above with reference to FIGS. 1 and 5, respectively) may be configured to compute the collision probabilities 655 and 660 and/or collision mapping 600 based on these factors and/or other information, such as historical collision count information.

As would be understood by a person of ordinary skill in the art, the features, structure, layout, and design of the collision mapping 600 is illustrative and can vary in alternative example embodiments. For example, the collision mapping 600 can include more or less details regarding the anchors, mobile devices, a venue in which the anchors and mobile devices are located, and the respective collision probabilities, in alternative example embodiments. In addition, the collision mapping 600 could constitute a collection of data in a form other than the form depicted in FIG. 6, such as one or more tables, charts, etc., which may or may not include a "map" or other diagram/drawing visually representing the venue, anchors, mobile devices, or collision probabilities.

Figure 7:
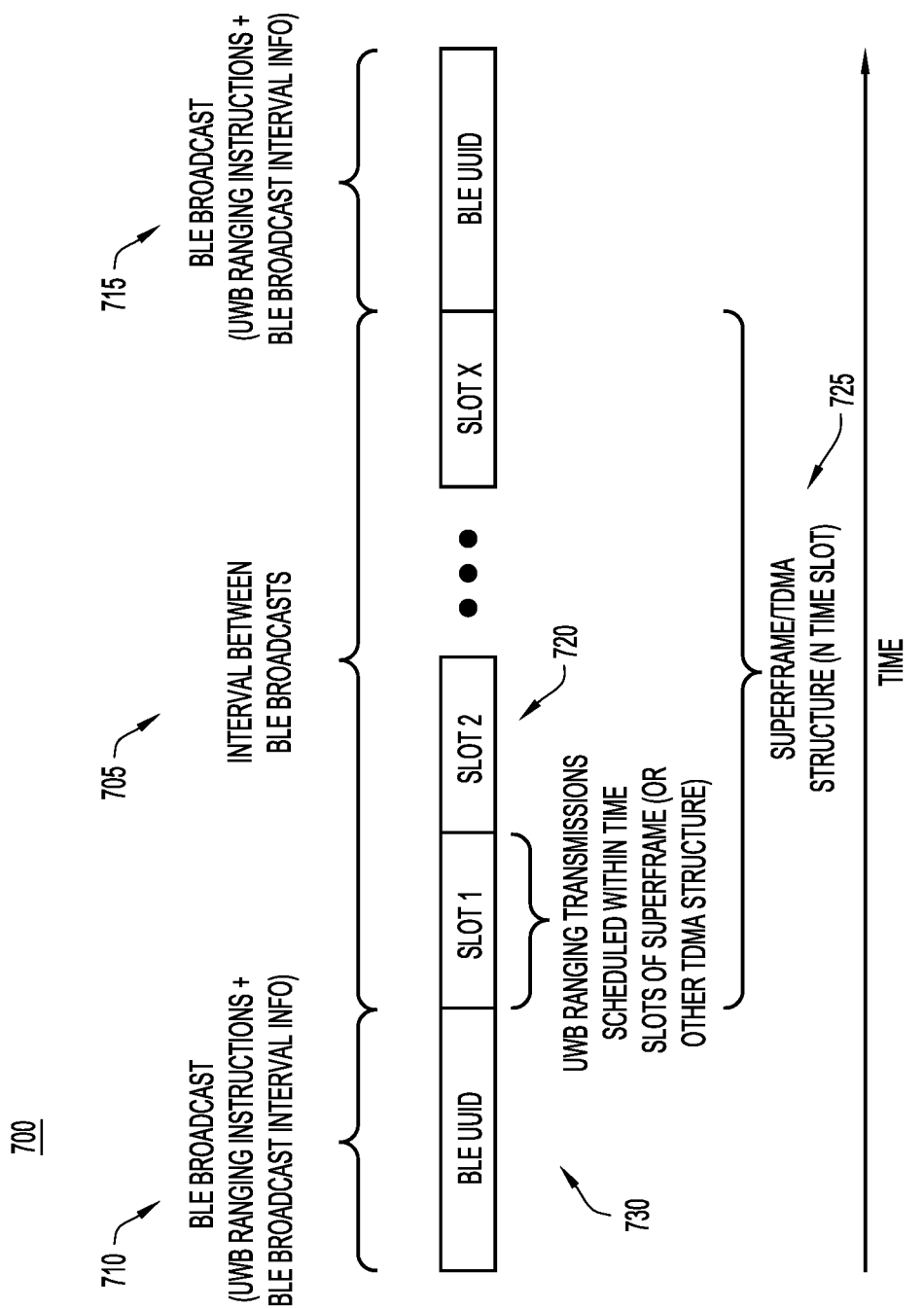
FIG. 7 is a diagram depicting how UWB ranging operations may be assigned between BLE broadcasts, according to an example embodiment.

FIG. 7 is a diagram depicting how UWB ranging operations may be assigned between BLE broadcasts, according to an example embodiment. In particular, FIG. 7 shows a Time Division Multiple Access (TDMA) procedure 700 in which a BLE broadcast interval 705, i.e., a time between two BLE UUID broadcasts (710, 715), is divided into a plurality of time slots 720 of a super-frame 725 or other (multicast, broadcast, or unicast) control frame or other TDMA structure. A control device (such as control device 180 or control device 580 described above with reference to FIGS. 1 and 5, respectively) is configured to coordinate UWB ranging functions, which may include scheduling for both the UWB anchors and the mobile devices that are performing UWB ranging functions, using the time slots 720.

In general, when a UWB anchor is to perform ranging, it may first transmit a super-frame, such as the super-frame 725, which encodes a ranging schedule 730 that indicates when each of the mobile devices assigned to the UWB anchor for UWB ranging are to reply to a UWB transmission (pulse) within the schedule. For example, the BLE broadcasts 710 and 715 can include UWB ranging instructions, including applicable interval 705 and time slot 720 information for the UWB ranging. The super-frame 725 may be configured to support a maximum number of slots 720. For example, the super-frame 725 may include 128 ranging time slots 720, which can enable ranging for up to 128 mobile devices in a given cycle, though it should be understood that other numbers of time slots 720 and mobile devices may be supported in alternative example embodiments.

When a UWB anchor transmits a super-frame 725 (e.g., via multicast, broadcast, or unicast) mobile devices may obtain the super-frame 725 and determine their scheduled transmission slot 720. For example, the super-frame 725 may include a frame with slots and bursts with an index indicating respective chips and/or bursts that should be used by each mobile device for UWB ranging. In an example embodiment, transmission slot information may be signaled to a mobile device via Wi-Fi and/or BLE transmissions that include parameters or other information that can be used by the mobile device for UWB ranging. Each mobile device may then send a UWB transmission, in turn, for ranging. For example, primary and secondary anchors may "hear" the UWB pulse response from the mobile device and, using their known physical location and geometry, range the mobile device. Example slot allocation and scheduling details, which may be used in connection with the example TDMA procedure 700 are described below with reference to FIG. 8.

It should be appreciated that the TDMA procedure 700 is illustrative and can vary in alternative example embodiments. In particular, it should be noted that use of a super-frame 725 is merely one mode by which transmission scheduling and other instructions may be provided. For example, an anchor can send a simple "control frame" that includes a list of indices in which each index is considered an upstream time slot. Each mobile device can determine its respective transmission position (e.g., how long after the control frame it is expected to transmit) based on its respective index. For example, if it is known that it takes 128 microseconds (μs) for each frame to be sent, a control frame indicating that "numbers 1, 3, and 5 send" may cause a mobile device having index number 1 to send immediately, a mobile device having an index number 3 to send after 128 μs, a mobile device having an index number 5 to send after 256 μs, and any other mobile devices to hold as they do not yet have a turn to transmit. Thus, while a super-frame 725 may include timing information (e.g., "transmit after x milliseconds" or the like), a control frame may only include an order or other triggering information without including a frame timer. In addition, or in the alternative, if a mobile device knows its transmission order and tempo, the mobile device may respond to a simple BLE beacon for purposes of transmission timing without using a separate control frame or super-frame (which may or may not be provided). For example, if a particular mobile device receives through a Wi-Fi (or other) transmission an indication that it is index number 5, then each time it hears a BLE beacon, it will wait 5 cycles (e.g., 5 times 128 μs) and then send a transmission. Additional variations for transmission scheduling timing and instructions will be apparent to a person of ordinary skill in the art.

Figure 8:
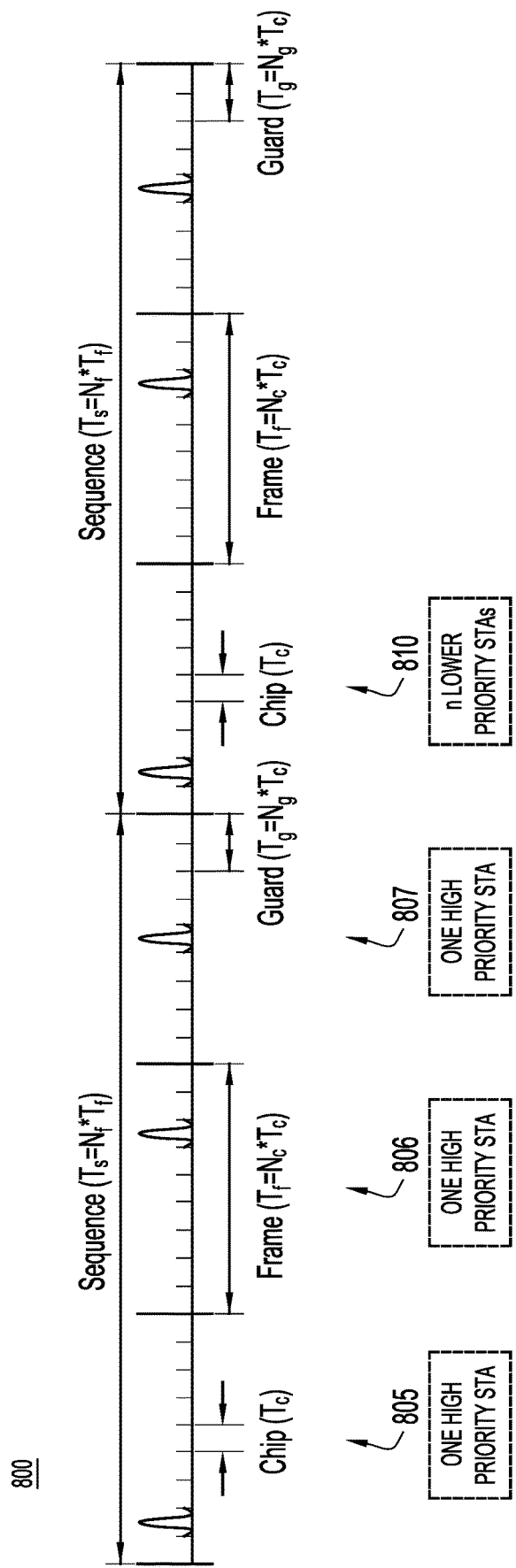
FIG. 8 is a diagram depicting how UWB ranging operations for mobile devices having different priorities can be scheduled in respective slots of a super-frame, according to an example embodiment.

FIG. 8 is a diagram depicting a procedure 800 for assigning mobile devices having different UWB ranging priorities to respective slots of a super-frame, according to an example embodiment. As illustrated in FIG. 8, a signal may include a series of pulses that are repeated over Nf frames, with one pulse p(t) per frame. Each frame includes Nc chips, each of a chip duration Tc. In order to avoid collisions between neighboring systems, UWB ranging may utilize a hopping sequence, which means that, within each frame, the UWB system picks a chip index during which the signal will be sent. By changing the Tc index used to transmit from one frame to the next, a UWB transmitter minimizes the risk of collision between competing transmitters. However, collisions still may occur, particularly when there is a high density of devices completing UWB ranging operations.

In an example embodiment, a control device (such as control device 180 or control device 580 described above with reference to FIGS. 1 and 5, respectively) is configured to create a ranging schedule by assigning mobile devices and anchors for ranging according to a sorted cascading priority and collision risk. For example, as noted at 805, 806, and 807 mobile devices that have high UWB ranging priority may each be assigned exclusively to different slots in the super-frame, while mobile devices having lesser UWB ranging priority may be assigned non-exclusively to shared slots (e.g., slot 810) of the super-frame. For example, having an exclusive slot in the super-frame may reduce (or potentially eliminate) collision risk for high priority devices.

In an example embodiment, randomization may be used to limit the number of collisions for devices assigned to a shared slot (e.g., slot 810). For example, if two mobile devices of medium priority are assigned to a same slot of 16 chips, a collision may occur if both of the mobile devices choose (randomly) to pulse on the same chip. Randomization techniques such as ALOHA may provide for a low collision risk for two mobile devices (e.g., 1/16), but the collision probability may increase as the number of mobile devices assigned to the slot increases. The control device may be configured to assign up to a maximum number of mobile devices per shared slot, e.g., based on relative priorities of the mobile devices. For example, the control device may be configured to assign a higher number of low priority devices to a shared slot and a lower number of medium or higher priority devices to a shared slot. The control device may assign the mobile devices to the slots, e.g., in an order starting with devices having a lowest collision probability.

In an example embodiment, the control device is configured to develop at least a preliminary ranging schedule for the mobile devices using these techniques. For example, the control device can be configured to "fill the air" with UWB ranging exchanges up to a maximum percentage of the available airtime. Therefore, an outcome of the preliminary ranging schedule may be that airtime resources are still available or that the schedule may consume all of the available airtime while some mobile devices are not allocated a slot. An example operation for refining the preliminary ranging schedule, e.g., to address one of these outcomes, is described below with reference to FIG. 9.

It should be appreciated that the procedure 800 is illustrative and can vary in alternative example embodiments. For example, a number of slots and assignments within each slot may vary depending on the implementation.

Figure 9:
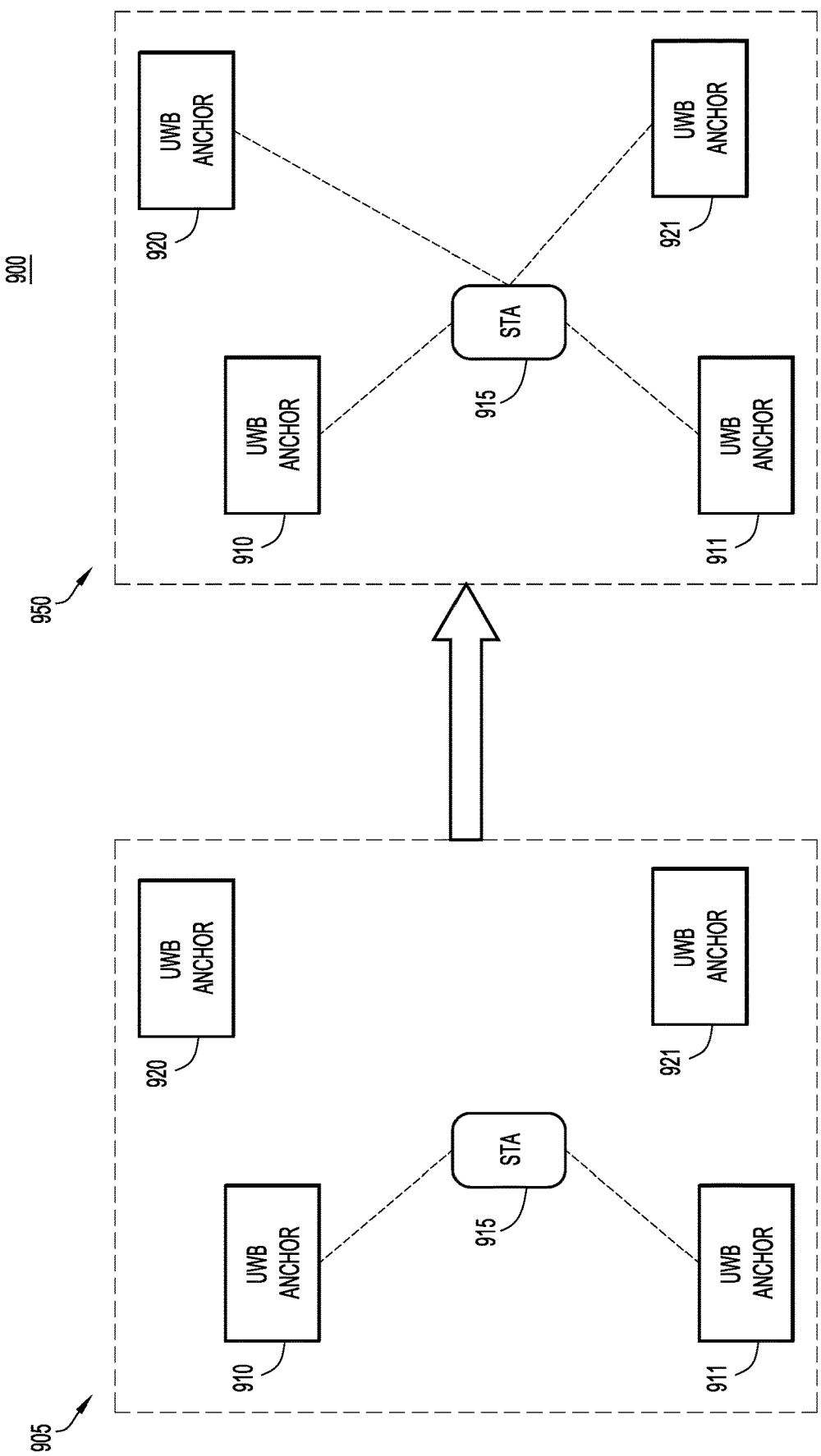
FIG. 9 is a diagram depicting a procedure for refining a preliminary UWB ranging schedule to establish a final UWB ranging schedule, according to an example embodiment.

FIG. 9 illustrates an operation 900 for refining a preliminary UWB ranging schedule to establish a final UWB ranging schedule, according to an example embodiment. In particular, the operation 900 includes adjusting a relative transmit power for a mobile device (STA 915) to change a relative UWB range of the mobile device. For example, the operation 900 can be completed by a control device (such as control device 180 or control device 580 described above with reference to FIGS. 1 and 5, respectively).

In a first stage 905, e.g., upon initially establishing a preliminary UWB ranging schedule involving STA 915 (and potentially other mobile devices in a space, which are not shown in FIG. 9 for purposes of simplicity), STA 915 is assigned to range against a set of UWB anchors including UWB anchors 910 and 911. For example, one of the UWB anchors 910, 911 may be assigned as a primary anchor and the other of the UWB anchors 910, 911 may be assigned as a secondary anchor. The control device is configured to assess, for STA 915 and, potentially for each of the other mobile devices in the space (which are not shown in FIG. 9 for purposes of simplicity), or a subset of the mobile devices in the space (e.g., mobile devices having a priority above a predetermined threshold), whether an adequate number of UWB anchor devices have been assigned and/or whether adequate triangulation coverage is provided by the assigned UWB anchor devices. For example, the control device can determine that STA 915 has an inadequate number (2) of assigned UWB anchor devices and/or that the assigned UWB anchor devices are in a limited, potentially inadequate, number (2) of quadrants to enable satisfactory triangulation with respect to STA 915.

In response to that determination, the control device can, in stage 950, determine a potential transmit power adjustment for STA 915, which would increase a range of STA 915 to reach additional (farther away) UWB anchors, namely UWB anchors 920 and 921. For example, the control device can determine an amount by which the transmit power is to be increased for STA 915 to reach one or both of the UWB anchors 920 and 921. As may be appreciated by a person of ordinary skill in the art, UWB allows the transmission of energy up to a maximum, regulated value (e.g., −41 decibel-milliwatts (dbM) per megahertz (MHz) and 300 milliseconds per minute). The control device may adjust a frame size to change the transmit power. For example, if the frame size is reduced, the transmit power may be increased (e.g., a 2 μs frame may be sent at −44 dBm max, while a 1 μs frame may be sent at twice that power, −41 dBm), and vice versa.

The control device can be configured to complete this transmit power adjustment assessment for all, some, or none of the mobile devices in the space. For example, the control device may forego the assessment, or have a higher tolerance for reduced anchor coverage, for lower priority mobile devices. The control device can establish a priority threshold above which the assessment may be completed and below which the assessment is not completed. In addition, or in the alternative, the control device can establish a threshold number of UWB anchor devices and/or triangulation quadrants below which the transmit power adjustment assessment will be completed, with different thresholds potentially being set for different priority mobile devices (e.g., with a lower tolerance for higher priority devices).

In an example embodiment, the control device can be further configured to complete an assessment regarding a potential decrease in the transmit power for a particular mobile device. For example, it may be advantageous to decrease a transmit power for a lower priority device within UWB range of several UWB anchors. In addition, or in the alternative, the control device can consider changes to refresh rates for some or all (or none) of the mobile devices to refine the preliminary UWB ranging schedule. For example, in a case where the preliminary UWB ranging schedule consumes all available airtime without allocating a slot to one or more mobile devices or allocating an insufficient number of slots to one or more mobile devices requiring repeated (potentially continual) ranging, the control device can consider slowing a refresh rate for one or more lower priority devices to provide additional ranging opportunities for other mobile devices. For example, while a maximum number (e.g., 128) of mobile devices may be ranged in a given cycle, if a large number of mobile devices are considered high priority and require continual ranging, a number of mobile devices listed in the ranging schedule may be reduced for each cycle, allowing the high priority mobile devices to be ranged more frequently. This may allow mobile devices that require continual ranging to be ranged more often than if a full capacity of mobile devices were ranging in each cycle.

Moreover, while the examples depicted and described herein consider ranging exchanges in which primary anchors provide responses to mobile device ranging transmissions, it should be appreciated that there may be ranging modes in which such anchor responses are not expected. For example, mobile devices may simply perform transmissions that are detected by anchors (e.g., one mobile device "blink" per second, detected by several secondary anchors). For such ranging modes, the ranging scheduling may be simplified only to account for mobile device interference as opposed to both mobile device transmission and anchor transmission interference.

If the control device identifies a potential change to the transmit power and/or refresh rate for a mobile device (e.g., the transmit power change reflected in stage 950 for STA 915), the control device can re-compute a collision probability and/or one or more collision mappings involving the mobile device to reflect the potential change. For example, the control device can assess an effect of the potential change on one or more collision probabilities and/or collision mappings for STA 915 in order to determine whether to implement the change in the UWB ranging schedule. As may be appreciated, for example, while increasing transmit power can increase UWB range, it also can potentially increase collision risk. The control device may balance these concerns when analyzing the updated collision probability information. For example, the control device may determine to (or not to) implement the potential transmit power and/or refresh rate change in a revised, final UWB ranging schedule, based on the updated collision probability information.

It should be appreciated that the operation 900 is illustrative and can vary in alternative example embodiments. For example, a number of mobile devices and anchors may vary.

Figure 10:
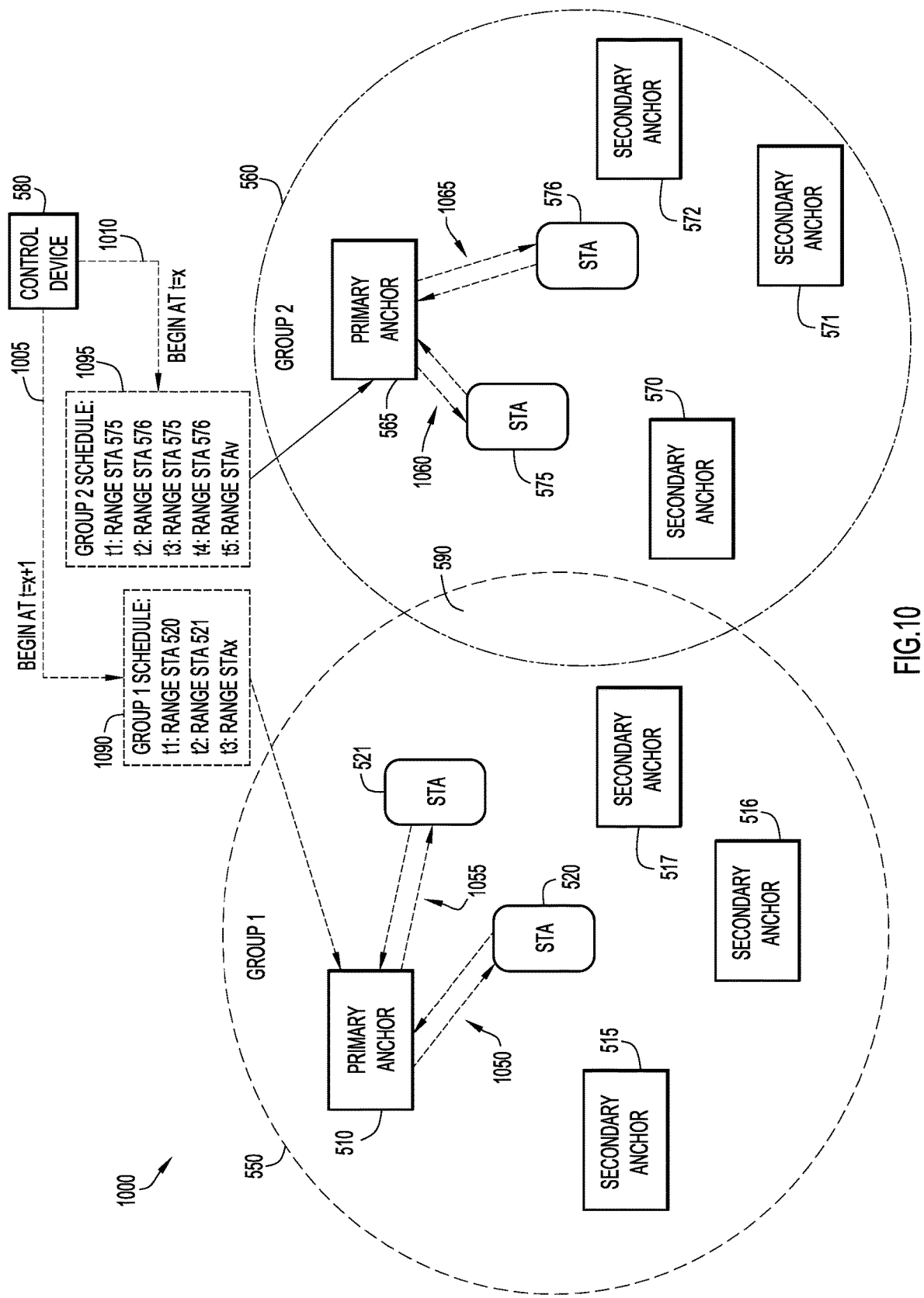
FIG. 10 is a diagram depicting a procedure for establishing a ranging schedule for a plurality of UWB anchors and a plurality of mobile devices, according to an example embodiment.

FIG. 10 is a diagram depicting a procedure 1000 for establishing a ranging schedule for a plurality of UWB anchors and a plurality of mobile devices, according to an example embodiment. In the operation 1000, a control device 580 has computed a UWB ranging schedule (e.g., including a power map and/or refresh rate) for each mobile device in a space, including STA 520 and STA 521, which are assigned to primary anchor 510 and secondary anchors 515-517 in Group 1, and STA 575, and STA 576, which are assigned to primary anchor 565 and secondary anchors 570-572 in Group 2. For example, the control device 580 can compute the UWB ranging schedule per the operations described above with reference to FIGS. 5-9.

The control device 580 programs/encodes the schedule into super-frames for the primary anchors 510 and 565, as shown at 1090 and 1095, respectively. For example, the super-frame 1090 for primary anchor 510 can include scheduling information (such as a tempo and/or order) for STA 520, STA 521, and/or any other mobile devices assigned to range against the primary anchor 510 (e.g., "STAx"), and the super-frame 1095 for primary anchor 565 can include scheduling information (such as a tempo and/or order) for STA 575, STA 576, and/or any other mobile devices assigned to range against the primary anchor 565 (e.g., "STAv"). The control device 580 transmits the scheduling information to each of the primary anchors 510 and 565, as shown at 1005 and 1010, respectively.

In turn, each of the primary anchors 510 and 565 transmits ranging requests to its assigned mobile devices. For example, primary anchor 510 can transmit ranging requests 1050 and 1055 (e.g., super-frame 1090) to STA 520 and STA 521, respectively, and primary anchor 565 can transmit ranging requests 1060 and 1065 (e.g., super-frame 1095) to STA 575 and STA 576, respectively. As may be appreciated, these transmissions can take any of a variety of different forms. For example, the primary anchors 510 and 565 can transmit ranging requests via multicast. In addition or in the alternative, BLE broadcasts or BLE unicast transmissions may be used to communicate ranging schedules to mobile devices and/or mobile device groups.

In an example embodiment, the UWB ranging priority for a particular mobile device (e.g., STA 520, STA 521, STA 575, or STA 576) may follow the mobile device if and as the mobile device changes locations within the space. The control device 580 may be configured to modify the ranging schedules as appropriate in response to such movement. For example, if movement of a particular mobile device causes the mobile device to fall out of range of a particular primary anchor, the control device can reassign the mobile device to range against a new (i.e., different) primary anchor, inserting the mobile device into the schedule for the new primary anchor. Similarly, the control device can remove the mobile device from the schedule of the previously assigned primary anchor. Although mobile device movement may be expected in certain implementations, the low power characteristics of UWB may result in slow transitions from one primary anchor to the next, thus potentially allowing schedules to be recomputed at regular intervals without requiring a continuous re-computation.

[0090] As shown in FIG. 10, in some instances, there is an overlapping region 590 in interference bubbles 550 and 560 for respective ranging groups. To avoid destructive interference, e.g., with respect to anchors (e.g., secondary anchors 517 and 570) at or near the region 590, the control device 580 can be configured to schedule both the ranging by the devices in the super-frames 1090 and 1095 and the transmission by the primary anchors 510 and 565 of their respective scheduling information. For example, as shown at 1005 and 1010, respectively, the control device 580 can instruct primary anchor 565 to begin transmission at t=x and primary anchor 510 to begin transmission at t=x+1. Thus, super-frame transmission may be staggered so that UWB pulses do not interfere with each other across adjacent groups (e.g., Groups 1 and 2). The control device 580 may permit UWB anchors that are not within UWB interference range of each other, e.g., UWB anchors outside of the interference bubbles 550 and 560, to transmit their super-frames simultaneously.

It should be appreciated that the operation 1000 is illustrative and can vary in alternative example embodiments. For example, a number of mobile devices and anchors and their respective locations, schedules, instructions, and configurations may vary.

Figure 11:
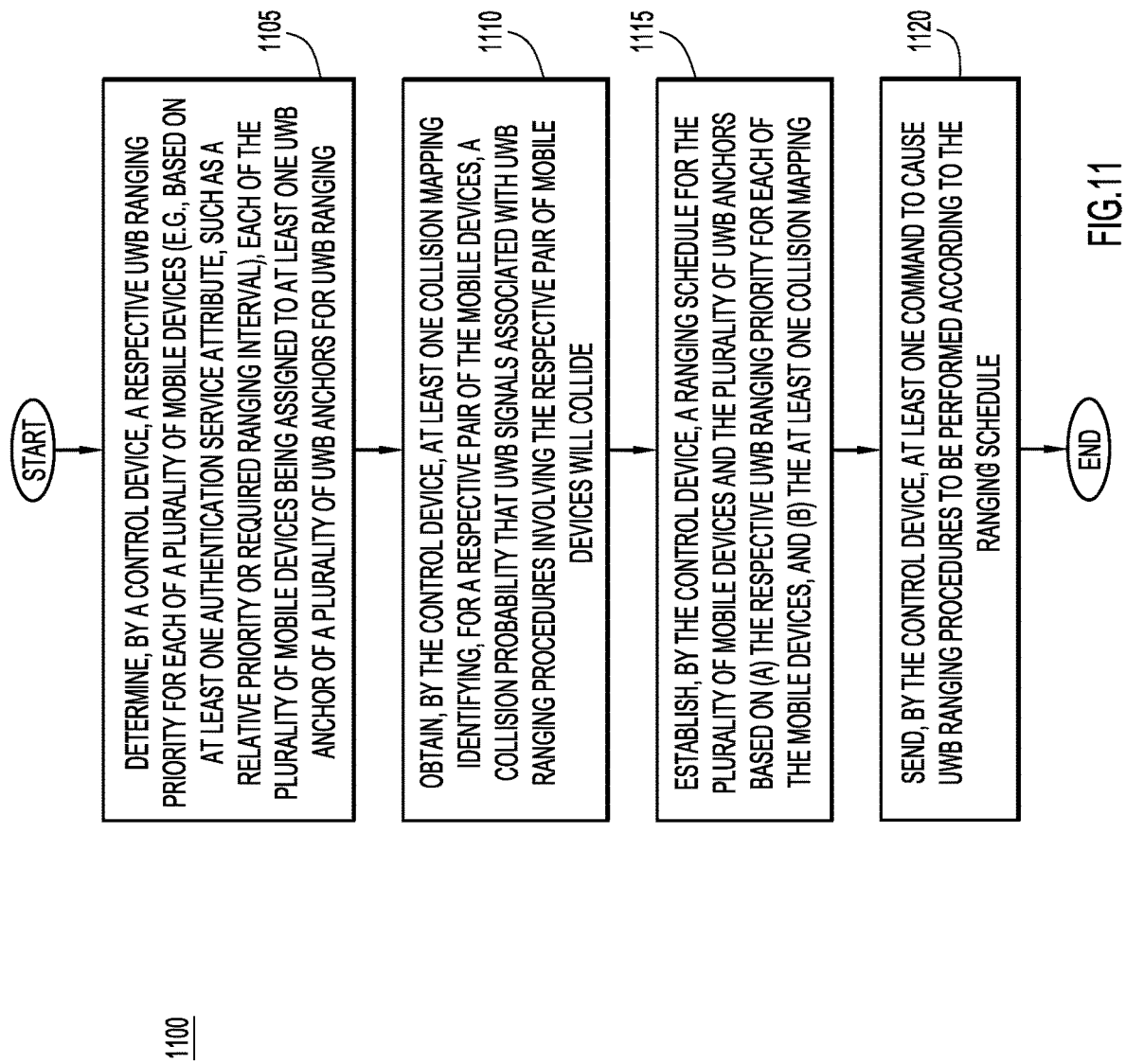
FIG. 11 is a flow chart depicting a method for prioritized scheduling for UWB ranging, according to an example embodiment.

Turning now to FIG. 11, a flow chart is shown for an example method 1100 for prioritized scheduling for UWB ranging, according to an example embodiment. In step 1105, a control device determines a respective UWB ranging priority for each of a plurality of mobile devices assigned to at least one UWB anchor of a plurality of UWB anchors for UWB ranging. For example, a UWB ranging priority for a particular mobile device may be determined based on at least one authentication service (e.g., RADIUS) attribute. The authentication service attribute(s) may be established, for example, when the mobile device first authenticates to a WLAN associated with the control device.

The attributes may include, e.g., a field indicating a relative priority (either directly or indirectly), a device type (e.g., a mobile phone vs. an asset tag, etc.), an operational use case (e.g., indoor wayfinding, asset tracking, etc.), and/or a required ranging interval. For example, a wireless asset tag utilizing continuous or frequent ranging, or ranging at regular intervals, or for critical or high priority equipment, may be designated as a high priority mobile device, while a mobile device for which ranging is not critical and/or for which ranging may be conducted less frequently, may be designated as a medium or low priority mobile device. It should be appreciated that a graduated index of priority may be defined with any amount of granularity. For example, priority may be designated on a binary scale with only two ("high" or "low") different priority types, a finely granulated scale with several different priority types (such as "low", "medium low", "medium", "medium high", "high", "extremely high", "critical", etc.), or another scale with another number of priority types. If no priority information is available for a particular mobile device, the control device can assign a default, "best effort," or other priority to the mobile device.

In step 1110, the control device obtains at least one collision mapping identifying, for a respective pair of the plurality of mobile devices, a collision probability that a UWB signal associated with a UWB ranging procedure involving a first mobile device of the respective pair of the plurality of mobile devices (e.g., a UWB signal transmitted to the first mobile device and/or a UWB signal transmitted from the first mobile device) will collide with a UWB signal associated with a UWB ranging procedure involving a second mobile device of the respective pair of the plurality of mobile devices (e.g., a UWB signal transmitted to the second mobile device and/or a UWB signal transmitted from the second mobile device). For example, two mobile devices ranging against a same set of UWB anchors may have a relatively high collision probability if they perform UWB ranging at a same time. In contrast, two mobile devices ranging against only a partially overlapping or non-overlapping set of UWB anchors may have a relatively moderate or low collision probability (with the probability depending on a variety of factors, including a number of common anchors and whether the common anchors are primary or secondary anchors).

In step 1115, the control device establishes a ranging schedule for the plurality of mobile devices and the plurality of UWB anchors based on the respective UWB ranging priority for each of the plurality of mobile devices, and the collision mapping(s). For example, the ranging schedule can enable ranging priority to be provided to higher priority devices in high-density or other environments in which UWB ranging operations involve limited UWB ranging infrastructure resources being demanded by multiple (in some cases, hundreds of) mobile devices. The scheduling may, for example, be configured to prevent signal collisions, which would cause ranging to fail for critical or other high priority devices. For example, the control device can create a ranging schedule for all mobile devices and UWB anchors based on a sorted cascading priority and collision risk. Example operations for establishing the ranging schedule are described in more detail below with reference to FIGS. 12 and 13.

In step 1120, the control device sends at least one command to cause UWB ranging procedures to be performed according to the established ranging schedule. For example, the control device can send instructions to each respective primary anchor in the plurality of UWB anchors, which include scheduling information for UWB ranging procedures involving the respective primary anchor.

Figure 12:
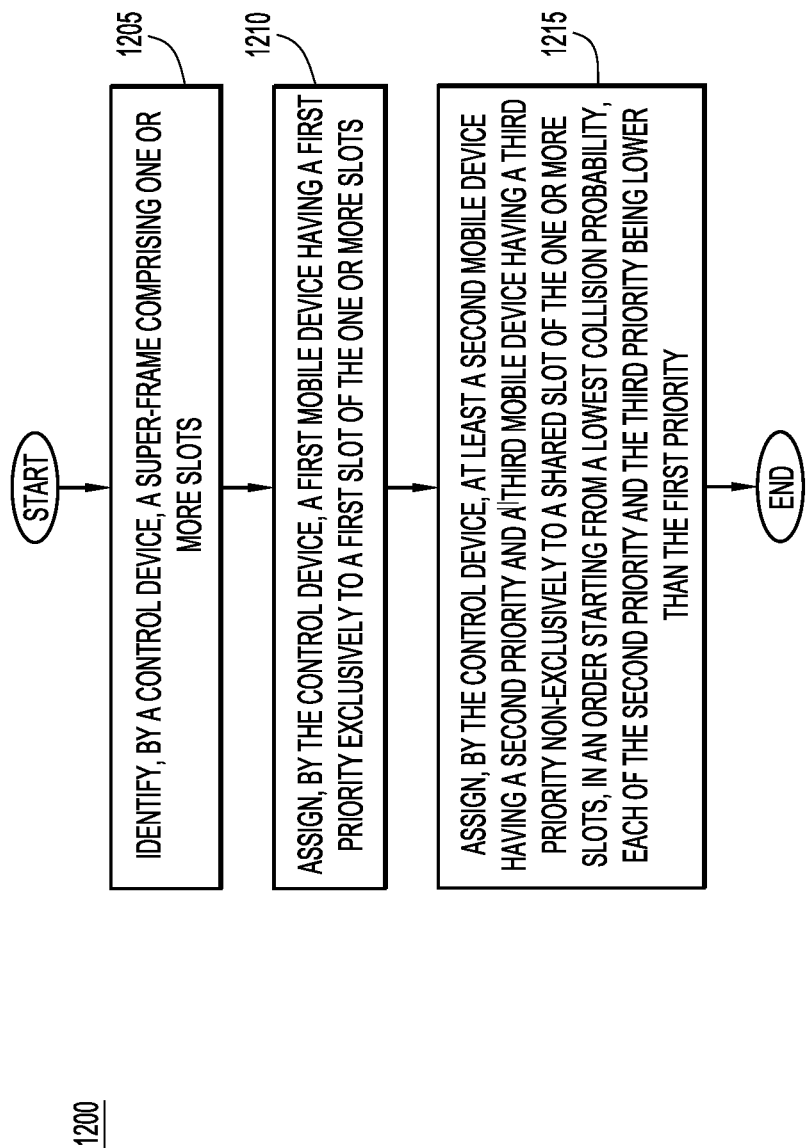
FIG. 12 is a flow chart depicting a method for scheduling UWB ranging operations for mobile devices having different priorities in respective slots of a super-frame, according to an example embodiment.

FIG. 12 illustrates a method 1200 for scheduling UWB ranging operations for mobile devices having different priorities in respective slots of a super-frame, according to an example embodiment. For example, the method 1200 can be performed as part of an operation for establishing a ranging schedule, such as the operation 1115 described above with reference to FIG. 11. In step 1205, a control device identifies a super-frame that includes one or more slots. For example, the control device can identify one or more super-frames for each of a plurality of primary UWB anchors. In step 1210, the control device assigns a first mobile device having a first priority exclusively to a first slot of the one or more slots. For example, the control device can assign a mobile device having a higher priority exclusively to its own slot of the super-frame, thereby potentially mitigating a risk of interference for that higher priority mobile device.

In step 1215, the control device assigns at least a second mobile device having a second priority and a third mobile device having a third priority non-exclusively to a shared slot of the one or more slots. Each of the second priority and third priority may, for example, be lower than the first priority. For example, the second and third mobile devices may have a moderate or lower UWB ranging priority. The control device may assign the second and third mobile devices to the shared slot, e.g., in an order starting from a lowest collision probability. Thus, there may exist a higher probability of collision for the second and third mobile devices relative to the first mobile device. For example, these allocations may reflect a determination by the control device that there is some level of acceptability for potential collisions involving the second and third mobile devices and little or no acceptability for potential collisions involving the first mobile device. However, the potential for collisions involving the second and third mobile devices may be mitigated both by assigning the devices in order from lowest collision probability and through use of randomization and other techniques.

Figure 13:
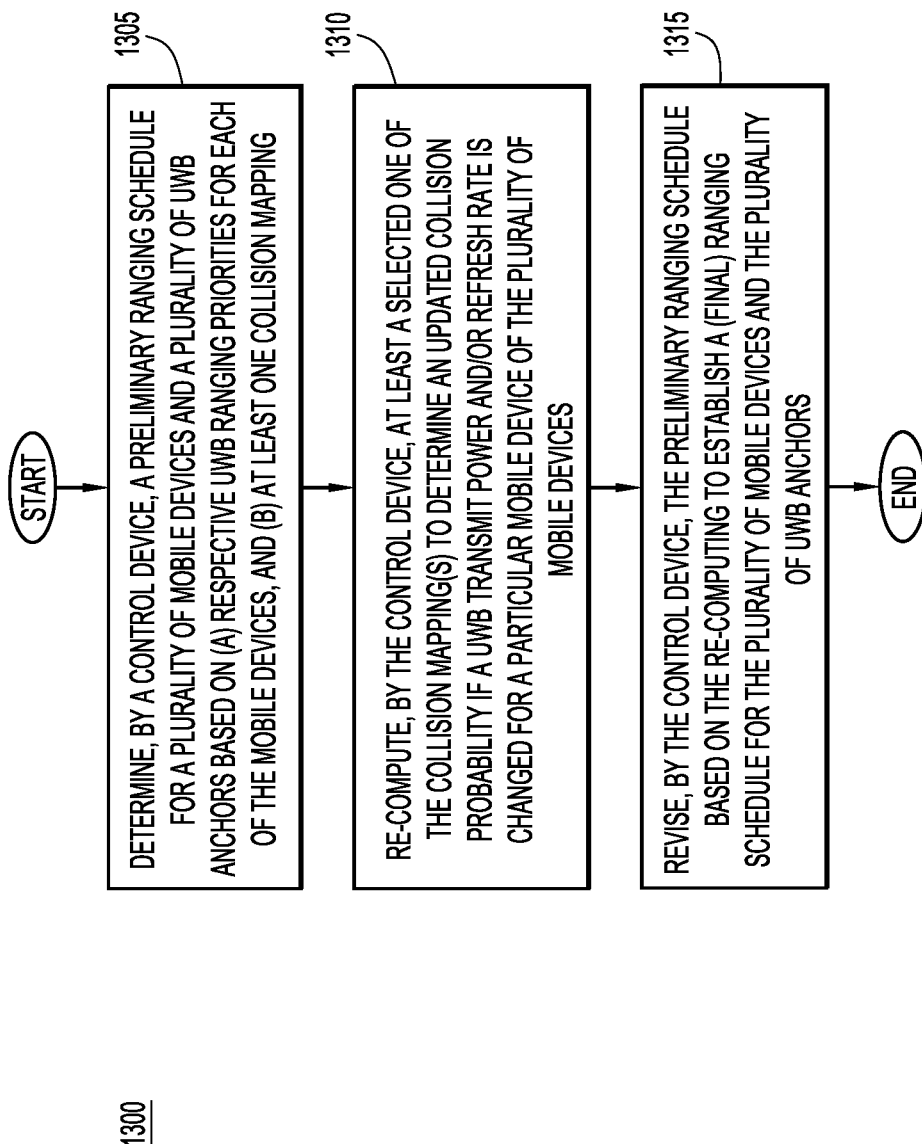
FIG. 13 is a flow chart depicting a method for refining a preliminary UWB ranging schedule to establish a final UWB ranging schedule, according to an example embodiment.

FIG. 13 illustrates a method 1300 for refining a preliminary UWB ranging schedule to establish a final UWB ranging schedule, according to an example embodiment. For example, the method 1300 can be performed as part of an operation for establishing a ranging schedule, such as the operation 1115 described above with reference to FIG. 11. In step 1305, a control device determines a preliminary ranging schedule for a plurality of mobile devices and a plurality of UWB anchors based on respective UWB ranging priorities for each of the mobile devices, and at least one collision mapping. For example, the control device can determine the preliminary ranging schedule based on a sorted cascading priority and collision risk for the mobile devices, as described above.

In step 1310, the control device re-computes at least a selected one of the collision mappings to determine an updated collision probability if a UWB transmit power and/or refresh rate is changed for a particular mobile device of the plurality of mobile devices. For example, the control device may assess, for each particular mobile device—or each particular mobile device of a subset of the mobile devices (e.g., mobile devices having a priority above a predetermined threshold)—whether the particular mobile device has an adequate number of assigned UWB anchor devices and/or adequate triangulation coverage by its assigned UWB anchor devices. If the control device determines that a particular mobile device has a limited (potentially inadequate) number of assigned UWB anchor devices or that the assigned UWB anchor devices are in a limited (potentially inadequate) number of quadrants to enable satisfactory triangulation with respect to the mobile device, the control device can re-compute at least a selected (corresponding) one of the collision mapping(s) to determine an updated collision probability if a UWB transmit power and/or refresh rate is changed for the particular mobile device. For example, increasing transmit power may increase a UWB range of the mobile device, thereby allowing the mobile device to reach additional (farther away) UWB anchors; however, increasing range also may increase relative collision probability. In step 1310, the control device can determine a relative change in collision probability that may exist if the transmit power and/or refresh rate are changed. As may be appreciated, the control device may forego this computation or have a higher tolerance for reduced anchor coverage for lower priority mobile devices.

In step 1315, the control device revises the preliminary ranging schedule based on the re-computing to establish a (final) ranging schedule for the plurality of mobile devices and the plurality of UWB anchors. For example, the control device may implement in the revised schedule a changed transmit power and/or refresh rate assessed in the computation of step 1310. As may be appreciated, in certain circumstances, the control device may elect not to implement one or more potential changes based on the computation. For example, if a potential change would materially increase a collision probability, the control device may elect not to implement the potential change.

Figure 14:
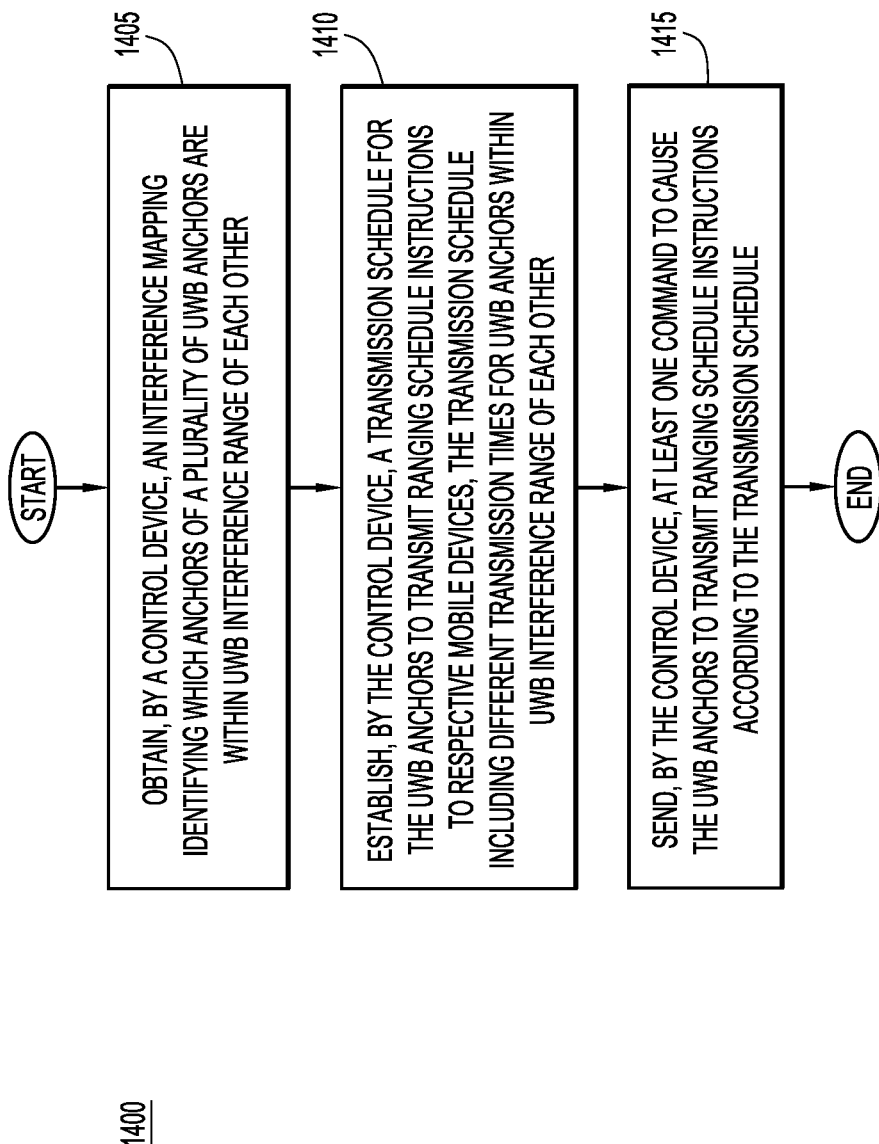
FIG. 14 is a flow chart depicting a method for scheduling transmission by UWB anchors of UWB ranging schedule instructions, according to an example embodiment.

FIG. 14 illustrates a method 1400 for scheduling transmission by UWB anchors of UWB ranging schedule instructions, according to an example embodiment. In step 1405, the control device calculates or otherwise obtains an interference mapping identifying which anchors of a plurality of UWB anchors are within UWB interference range of each other. For example, the control device can instruct each primary UWB anchor in a space to send a multicast frame, which can be used for purposes of creating the interference mapping and potentially also for group determination purposes and/or time synchronization or other purposes. Each receiving anchor can receive and/or demodulate any UWB transmissions within their range and forward to the control device received frame signal level, emitted source, and/or other information, which the control device can use to create the interference mapping.

In step 1410, the control device establishes a transmission schedule for the UWB anchors to transmit ranging schedule instructions (e.g., super-frames) to respective mobile devices. The transmission schedule can include different transmission times for UWB anchors within UWB interference range of each other. For example, the control device may schedule a first UWB anchor to begin its transmission at a time of t=x and a second UWB anchor within interference range of the first UWB anchor to begin its transmission at a time of t=x+1. Thus, scheduling for super-frame transmission may be staggered so that UWB pulses do not interfere with each other across adjacent groups. The control device may schedule UWB anchors that are not within UWB interference range of each other to transmit their super-frames simultaneously. In step 1415, the control device sends at least one command to cause the UWB anchors to transmit ranging schedule instructions according to the transmission schedule.

Figure 15:
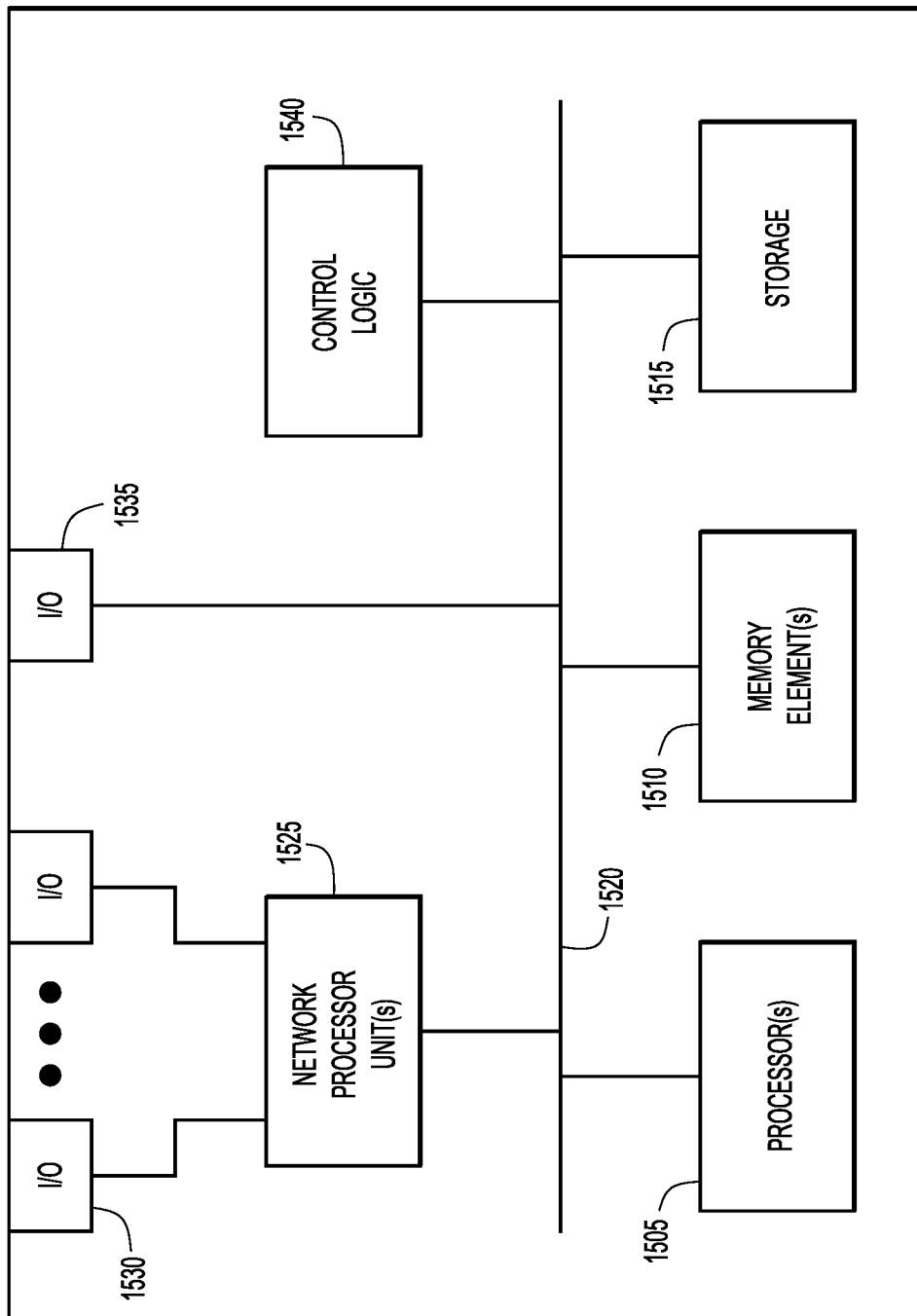
FIG. 15 is a block diagram of a computing device configured to perform functions associated with the techniques described herein, according to an example embodiment.

Referring to FIG. 15, FIG. 15 illustrates a hardware block diagram of a computing device 1500 that may perform functions associated with operations discussed herein in connection with the techniques depicted in FIGS. 1-14. In various embodiments, a computing device, such as computing device 1500 or any combination of computing devices 1500, may be configured as any entity/entities as discussed for the techniques depicted in connection with FIGS. 1-14, such as the control device 180, controller 185, area engine 195, or location engine 190 shown in FIG. 1 or the control device 580 shown in FIGS. 5 and 10, in order to perform operations of the various techniques discussed herein.

In at least one embodiment, the computing device 1500 may include one or more processor(s) 1505, one or more memory element(s) 1510, storage 1515, a bus 1520, one or more network processor unit(s) 1525 interconnected with one or more network input/output (I/O) interface(s) 1530, one or more I/O interface(s) 1535, and control logic 1540. In various embodiments, instructions associated with logic for computing device 1500 can overlap in any manner and are not limited to the specific allocation of instructions and/or operations described herein.

In at least one embodiment, processor(s) 1505 is/are at least one hardware processor configured to execute various tasks, operations and/or functions for computing device 1500 as described herein according to software and/or instructions configured for computing device 1500. Processor(s) 1505 (e.g., a hardware processor) can execute any type of instructions associated with data to achieve the operations detailed herein. In one example, processor(s) 1505 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1510 and/or storage 1515 is/are configured to store data, information, software, and/or instructions associated with computing device 1500, and/or logic configured for memory element(s) 1510 and/or storage 1515. For example, any logic described herein (e.g., control logic 1540) can, in various embodiments, be stored for computing device 1500 using any combination of memory element(s) 1510 and/or storage 1515. Note that in some embodiments, storage 1515 can be consolidated with memory element(s) 1510 (or vice versa), or can overlap/exist in any other suitable manner.

In at least one embodiment, bus 1520 can be configured as an interface that enables one or more elements of computing device 1500 to communicate in order to exchange information and/or data. Bus 1520 can be implemented with any architecture designed for passing control, data and/or information between processors, memory elements/storage, peripheral devices, and/or any other hardware and/or software components that may be configured for computing device 1500. In at least one embodiment, bus 1520 may be implemented as a fast kernel-hosted interconnect, potentially using shared memory between processes (e.g., logic), which can enable efficient communication paths between the processes.

In various embodiments, network processor unit(s) 1525 may enable communication between computing device 1500 and other systems, entities, etc., via network I/O interface(s) 1530 to facilitate operations discussed for various embodiments described herein. In various embodiments, network processor unit(s) 1525 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1530 can be configured as one or more Ethernet port(s), Fibre Channel ports, and/or any other I/O port(s) now known or hereafter developed. Thus, the network processor unit(s) 1525 and/or network I/O interface(s) 1530 may include suitable interfaces for receiving, transmitting, and/or otherwise communicating data and/or information in a network environment.

interface(s) 1535 allow for input and output of data and/or information with other entities that may be connected to computer device 1500. For example, I/O interface(s) 1535 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1540 can include instructions that, when executed, cause processor(s) 1505 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1540) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), ASIC, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1510 and/or storage 1515 can store data, software, code, instructions (e.g., processor instructions), logic, parameters, combinations thereof, and/or the like used for operations described herein. This includes memory element(s) 1510 and/or storage 1515 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include determining, by a control device, a respective Ultra-Wideband (UWB) ranging priority for each of a plurality of mobile devices, each of the plurality of mobile devices being assigned to at least one UWB anchor of a plurality of UWB anchors for UWB ranging. For example, determining the respective UWB ranging priority can include obtaining at least one authentication service attribute associated with each particular one of the plurality of mobile devices. Obtaining the at least one authentication service attribute associated with each particular one of the plurality of mobile devices can include, for example, obtaining in the at least one authentication service attribute at least one of a field indicating a relative priority or a required ranging interval.

The control device can obtain at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices. The control device can establish a ranging schedule for the plurality of mobile devices and the plurality of UWB anchors based on the respective UWB ranging priority for each of the plurality of mobile devices and the at least one collision mapping. For example, establishing the ranging schedule can include, for respective primary UWB anchors of the plurality of UWB anchors, allocating one or more slots of a super-frame to the mobile devices assigned to the primary UWB anchors. Allocating the one or more slots of the super-frame can include, for example, assigning a first mobile device having a first priority exclusively to a first slot of the one or more slots and assigning a second mobile device having a second priority lower than the first priority non-exclusively to a shared slot of the one or more slots. Assigning the second mobile device to the shared slot can, e.g., be part of an assignment of multiple mobile devices to the shared slot, the assignment of the multiple mobile devices being performed in an order starting from a lowest collision probability.

The control device can send at least one command to cause UWB ranging procedures to be performed according to the ranging schedule. For example, the at least one command can cause at least one primary UWB anchor of the plurality of UWB anchors to transmit a frame to particular mobile devices of the plurality of mobile devices, which particular mobile devices are assigned to the primary UWB anchor for ranging, the frame encoding scheduling information for the particular mobile devices to range according to the ranging schedule.

In an example embodiment, the computer-implemented method can further include obtaining, by the control device, an interference mapping identifying which UWB anchors of the plurality of UWB anchors are within UWB interference range of each other. For example, establishing the ranging schedule can include scheduling transmission of ranging schedule instructions at different times by UWB anchors within UWB interference range of each other.

In another form, an apparatus can include an interface configured to enable network communications, and one or more processors coupled to the interface. The one or more processors can be configured to perform operations including, e.g.: determining a respective Ultra-Wideband (UWB) ranging priority for each of a plurality of mobile devices, each of the plurality of mobile devices being assigned to at least one UWB anchor of a plurality of UWB anchors for UWB ranging; obtaining at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices; establishing a ranging schedule for the plurality of mobile devices and the plurality of UWB anchors based on the respective UWB ranging priority for each of the plurality of mobile devices and the at least one collision mapping; and sending at least one command to cause UWB ranging procedures to be performed according to the ranging schedule.

In another form, one or more non-transitory computer readable storage media can include instructions that, when executed by at least one processor, are operable to: determine a respective Ultra-Wideband (UWB) ranging priority for each of a plurality of mobile devices, each of the plurality of mobile devices being assigned to at least one UWB anchor of a plurality of UWB anchors for UWB ranging; obtain at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices; establish a ranging schedule for the plurality of mobile devices and the plurality of UWB anchors based on the respective UWB ranging priority for each of the plurality of mobile devices and the at least one collision mapping; and send at least one command to cause UWB ranging procedures to be performed according to the ranging schedule.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   determining, by a control device, a respective Ultra-Wideband (UWB) ranging priority for each of a plurality of mobile devices, each of the plurality of mobile devices being assigned to at least one UWB anchor of a plurality of UWB anchors for UWB ranging;
   obtaining, by the control device, at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices;

establishing, by the control device, a ranging schedule for the plurality of mobile devices and the plurality of UWB anchors based on the respective UWB ranging priority for each of the plurality of mobile devices and the at least one collision mapping; and sending, by the control device, at least one command to cause UWB ranging procedures to be performed according to the ranging schedule.

2. The computer-implemented method of claim 1, further comprising obtaining, by the control device, an interference mapping identifying which UWB anchors of the plurality of UWB anchors are within UWB interference range of each other, wherein establishing the ranging schedule comprises scheduling transmission of ranging schedule instructions at different times by UWB anchors within UWB interference range of each other.

3. The computer-implemented method of claim 1, wherein the at least one command causes at least one primary UWB anchor of the plurality of UWB anchors to transmit a frame to particular mobile devices of the plurality of mobile devices, which particular mobile devices are assigned to the primary UWB anchor for ranging, the frame encoding scheduling information for the particular mobile devices to range according to the ranging schedule.

4. The computer-implemented method of claim 1, wherein establishing the ranging schedule comprises, for respective primary UWB anchors of the plurality of UWB anchors, allocating one or more slots of a super-frame to the mobile devices assigned to the primary UWB anchors.

5. The computer-implemented method of claim 4, wherein allocating the one or more slots of the super-frame comprises assigning a first mobile device having a first priority exclusively to a first slot of the one or more slots and assigning a second mobile device having a second priority lower than the first priority non-exclusively to a shared slot of the one or more slots.

6. The computer-implemented method of claim 5, wherein assigning the second mobile device to the shared slot is part of an assignment of multiple mobile devices to the shared slot, the assignment of the multiple mobile devices performed in an order starting from a lowest collision probability.

7. The computer-implemented method of claim 1, wherein establishing the ranging schedule comprises:

re-computing at least a selected one of the at least one collision mapping to determine an updated collision probability if a UWB transmit power is changed for a particular mobile device of the plurality of mobile devices, and revising the ranging schedule based on the re-computing.

8. The computer-implemented method of claim 1, wherein determining the respective UWB ranging priority comprises obtaining at least one authentication service attribute associated with each particular one of the plurality of mobile devices.

9. The computer-implemented method of claim 8, wherein obtaining the at least one authentication service attribute associated with each particular one of the plurality of mobile devices comprises obtaining in the at least one authentication service attribute at least one of a field indicating a relative priority or a required ranging interval.

10. An apparatus comprising:

an interface configured to enable network communications; and one or more processors coupled to the interface and configured to perform operations including:

determining a respective Ultra-Wideband (UWB) ranging priority for each of a plurality of mobile devices, each of the plurality of mobile devices being assigned to at least one UWB anchor of a plurality of UWB anchors for UWB ranging;

obtaining at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices;

establishing a ranging schedule for the plurality of mobile devices and the plurality of UWB anchors based on the respective UWB ranging priority for each of the plurality of mobile devices and the at least one collision mapping; and sending at least one command to cause UWB ranging procedures to be performed according to the ranging schedule.

11. The apparatus of claim 10, wherein the one or more processors are further configured to:

obtain an interference mapping identifying which UWB anchors of the plurality of UWB anchors are within UWB interference range of each other, and establish the ranging schedule by scheduling transmission of ranging schedule instructions at different times by UWB anchors within UWB interference range of each other.

12. The apparatus of claim 10, wherein the one or more processors are further configured to establish the ranging schedule by, for respective primary UWB anchors of the plurality of UWB anchors, allocating one or more slots of a super-frame to the mobile devices assigned to the primary UWB anchors.

13. The apparatus of claim 12, wherein the one or more processors are further configured to allocate the one or more slots of the super-frame by assigning a first mobile device having a first priority exclusively to a first slot of the one or more slots and assigning a second mobile device having a second priority lower than the first priority non-exclusively to a shared slot of the one or more slots.

14. The apparatus of claim 10, wherein the one or more processors are further configured to determine the respective UWB ranging priority for each of the plurality of mobile devices by obtaining at least one authentication service attribute associated with each particular one of the plurality of mobile devices.

15. The apparatus of claim 10, wherein the one or more processors are further configured to:

re-compute at least a selected one of the at least one collision mapping to determine an updated collision probability if a UWB transmit power is changed for a particular mobile device of the plurality of mobile devices, and revise the ranging schedule based on re-computing of the selected one of the at least one collision mapping.

16. One or more non-transitory computer readable storage media comprising instructions that, when executed by at least one processor, are operable to:
- determine a respective Ultra-Wideband (UWB) ranging priority for each of a plurality of mobile devices, each of the plurality of mobile devices being assigned to at least one UWB anchor of a plurality of UWB anchors for UWB ranging;
- obtain at least one collision mapping identifying, for a respective pair of the plurality of mobile devices, a collision probability that a UWB signal associated with a UWB ranging procedure involving a first mobile device of the respective pair of the plurality of mobile devices will collide with a UWB signal associated with a UWB ranging procedure involving a second mobile device of the respective pair of the plurality of mobile devices;
- establish a ranging schedule for the plurality of mobile devices and the plurality of UWB anchors based on the respective UWB ranging priority for each of the plurality of mobile devices and the at least one collision mapping; and
- send at least one command to cause UWB ranging procedures to be performed according to the ranging schedule.

17. The one or more non-transitory computer readable storage media of claim 16, wherein the instructions further cause the processor to:
- obtain an interference mapping identifying which UWB anchors of the plurality of UWB anchors are within UWB interference range of each other, and
- establish the ranging schedule by scheduling transmission of ranging schedule instructions at different times by UWB anchors within UWB interference range of each other.

18. The one or more non-transitory computer readable storage media of claim 16, wherein the instructions further cause the processor to establish the ranging schedule by, for respective primary UWB anchors of the plurality of UWB anchors, allocating one or more slots of a super-frame to the mobile devices assigned to the primary UWB anchors, the allocating comprising assigning a first mobile device having a first priority exclusively to a first slot of the one or more slots and assigning a second mobile device having a second priority lower than the first priority non-exclusively to a shared slot of the one or more slots.

19. The one or more non-transitory computer readable storage media of claim 16, wherein the instructions further cause the processor to determine the respective UWB ranging priority for each of the plurality of mobile devices by obtaining at least one authentication service attribute associated with each particular one of the plurality of mobile devices.

20. The one or more non-transitory computer readable storage media of claim 16, wherein the instructions further cause the processor to:
- re-compute at least a selected one of the at least one collision mapping to determine an updated collision probability if a UWB transmit power is changed for a particular mobile device of the plurality of mobile devices, and
- revise the ranging schedule based on the re-computing.

* * * * *